US011733880B2

(12) United States Patent
Durham

(10) Patent No.: US 11,733,880 B2
(45) Date of Patent: Aug. 22, 2023

(54) MEMORY REGION ALLOCATION TO A SOFTWARE PROGRAM

(71) Applicant: Intel Corporation, Santa Clara, CA (US)

(72) Inventor: David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 17/317,716

(22) Filed: May 11, 2021

(65) Prior Publication Data

US 2021/0349634 A1 Nov. 11, 2021

Related U.S. Application Data

(63) Continuation of application No. 16/236,117, filed on Dec. 28, 2018, now Pat. No. 11,010,067.

(51) Int. Cl.
*G06F 3/06* (2006.01)
*G06F 12/0802* (2016.01)
(Continued)

(52) U.S. Cl.
CPC ............ *G06F 3/062* (2013.01); *G06F 3/0646* (2013.01); *G06F 3/0679* (2013.01);
(Continued)

(58) Field of Classification Search
CPC ...... G06F 3/062; G06F 3/0646; G06F 3/0679; G06F 12/0802; G06F 2212/653;
(Continued)

(56) References Cited

U.S. PATENT DOCUMENTS 5,396,604 A 3/1995 Delano et al.
6,226,715 B1 * 5/2001 Van Der Wolf ...... G06F 12/121
711/E12.07
(Continued)

OTHER PUBLICATIONS

Examination Report, IN App. No. 202147023083, dated Aug. 10, 2022, 5 pages.
(Continued)

*Primary Examiner* — Christopher D Birkhimer
(74) *Attorney, Agent, or Firm* — Nicholson De Vos Webster & Elliott LLP

(57) ABSTRACT

Embodiments of methods and apparatuses for defending against speculative side-channel analysis on a computer system are disclosed. In an embodiment, a processor includes a decoder, a cache, address translation circuitry, a cache controller, and a memory controller. The decoder is to decode an instruction. The instruction is to specify a first address associated with a data object, the first address having a first memory tag. The address translation circuitry is to translate the first address to a second address, the second address to identify a memory location of the data object. The comparator is to compare the first memory tag and a second memory tag associated with the second address. The cache controller is to detect a cache miss associated with the memory location. The memory controller is to, in response to the comparator detecting a match between the first memory tag and the second memory tag and the cache controller detecting the cache miss, load the data object from the memory location into the cache. Other embodiments include encryption of memory tags together with addresses.

20 Claims, 23 Drawing Sheets

(51) Int. Cl.
  *H04L 9/08* (2006.01)
  *H04L 9/00* (2022.01)
(52) U.S. Cl.
  CPC .......... *G06F 12/0802* (2013.01); *H04L 9/003* (2013.01); *H04L 9/088* (2013.01)
(58) Field of Classification Search
  CPC ............. G06F 12/0864; G06F 12/0895; G06F 12/1045; G06F 12/1408; G06F 12/1425; G06F 12/1491; G06F 21/73; G06F 2212/1052; G06F 21/79; G06F 21/55; G06F 21/602; G06F 21/62; G06F 2207/7219; H04L 9/003; H04L 9/088; H04L 9/0894; H04L 9/0618
  See application file for complete search history.

(56) References Cited

U.S. PATENT DOCUMENTS

| | | | |
|---|---|---|---|
| 7,475,321 B2* | 1/2009 | Gurumurthi | G06F 11/0724 711/155 |
| 8,732,409 B2* | 5/2014 | Van Der Wolf | G06F 12/0804 711/143 |
| 8,909,942 B1* | 12/2014 | Obukhov | G06F 12/1408 257/659 |
| 9,111,621 B2* | 8/2015 | Krutzik | G11C 16/22 |
| 9,405,920 B1 | 8/2016 | Roth et al. | |
| 9,892,803 B2* | 2/2018 | Reed | G06F 12/0811 |
| 2001/0025340 A1* | 9/2001 | Marchant | G06F 21/6272 713/150 |
| 2004/0039880 A1* | 2/2004 | Pentkovski | G06F 12/0811 711/146 |
| 2006/0004957 A1* | 1/2006 | Hand, III | G06F 12/0866 711/E12.019 |
| 2006/0005074 A1* | 1/2006 | Yanai | H04L 67/1095 714/6.32 |
| 2006/0143406 A1* | 6/2006 | Chrysos | G06F 12/0811 711/143 |
| 2006/0156155 A1* | 7/2006 | Gurumurthi | G06F 11/0724 714/746 |
| 2008/0133629 A1 | 6/2008 | Stribaek et al. | |
| 2008/0189477 A1* | 8/2008 | Asano | G06F 12/0246 711/E12.008 |
| 2009/0172267 A1* | 7/2009 | Oribe | G11C 16/3418 711/E12.008 |
| 2009/0177895 A1* | 7/2009 | Murayama | G06F 21/6236 711/E12.001 |
| 2009/0220088 A1* | 9/2009 | Lu | G06F 21/554 713/189 |
| 2010/0205344 A1 | 8/2010 | Caprioli et al. | |
| 2011/0161784 A1* | 6/2011 | Selinger | G06F 11/1016 714/E11.002 |
| 2012/0246442 A1 | 9/2012 | Dolgunov et al. | |
| 2013/0111132 A1 | 5/2013 | Zheng et al. | |
| 2013/0238907 A1 | 9/2013 | Debout et al. | |
| 2014/0237147 A1* | 8/2014 | Joshi | G06F 3/0664 710/74 |
| 2015/0339188 A1* | 11/2015 | Hu | G06F 11/3034 714/704 |
| 2015/0341170 A1 | 11/2015 | Tolfmans | |
| 2016/0188486 A1 | 6/2016 | Sohi et al. | |
| 2016/0254905 A1 | 9/2016 | Durham et al. | |
| 2017/0192902 A1 | 7/2017 | Hwang et al. | |
| 2017/0262381 A1 | 9/2017 | Swaine | |
| 2018/0129620 A1 | 5/2018 | Gittins | |
| 2019/0108130 A1 | 4/2019 | Durham et al. | |

OTHER PUBLICATIONS

Elbaz, R. et al.; "How to Add the Integrity Checking Capability to Block Encryption Algorithms;" Sep. 11, 2006; IEEE available at: https://ieeexplore.ieee.org/document/1689972 (Year: 2006).
Intel's White Paper; "Intel Analysis of Speculative Execution Side Channels;" Jan. 2018; Intel; Available at: https://newsroom.intel.com/wp-content/uploads/sites/11/2018/01/Intel-Analysis-of-Speculative-Execution-Side-Channels.pdf (Year: 2018).
International Preliminary Report on Patentability, PCT App. No. PCT/US2019/063994, dated Jul. 8, 2021, 7 pages.
International Search Report and Written Opinion, PCT App No. PCT/US2019/063994, dated Mar. 18, 2020, 10 pages.
Liskov, Moses et. al.; "Tweakable Block Ciphers" Sep. 2, 2010; Journal of Cryptology; available at: https://link.springer.com/content/pdf/10.1007/S00145-010-9073-y.pdf (Year: 2010).
Non-Final Office Action, U.S. Appl. No. 16/236,117, dated Sep. 29, 2020, 21 pages.
Notice of Allowance, U.S. Appl. No. 16/236,117, dated Jan. 25, 2021, 10 pages.
Requirement for Restriction/Election, U.S. Appl. No. 16/236,117, dated Apr. 10, 2020, 6 pages.
Suh, Edward et. al.; "AEGIS: Architecture for Tamper-Evident and Tamper-Resistant Processing;" Aug. 31, 2012; Computer Science and Artificial Intelligence Laboratory (CSAIL); available at: https://web.archive.org/web/20120831162209/http://csg.csail.mit.edu/pubs/memos/Memo-461/memo-461 .pdf (Year: 2012).
Gretton-Dann Matthew: "Arm Architecture Armv8.5-A Announcement—Architectures and Processors blog—Arm Community blogs—Arm Community", Sep. 17, 2018 (Sep. 17, 2018), pp. 1-6, XP055947113.
Office Action, EP App. No. 19903331.7, dated Aug. 5, 2022, 4 pages.
Serebryany K., "Hardware Memory Tagging to Make C/C++ Memory Safe(r)," iSecCon'18, Dec. 2018, retrieved from the Internet: https://github.com/google/sanitizers/blob/master/hwaddress-sanitizer/MTE-iSecCon-2018.pdf on Sep. 26, 2019, 63 pages.

* cited by examiner

MEMORY REGION ALLOCATION TO A SOFTWARE PROGRAM

FIELD OF THE INVENTION

The field of invention relates generally to computers, and, more specifically, to computer system security.

BACKGROUND

Computer systems may be vulnerable to attempts by adversaries to obtain confidential, private, or secret confidential information. For example, attacks, such as Spectre and Meltdown, exploit speculative and out-of-order execution capabilities of processors to illicitly read data through side-channel analysis.

BRIEF DESCRIPTION OF THE DRAWINGS

The present invention is illustrated by way of example and not limitation in the figures of the accompanying drawings, in which like references indicate similar elements and in which:

FIG. 17 shows a block diagram of a system in accordance with one embodiment of the present invention;

FIG. 18 is a block diagram of a first more specific exemplary system in accordance with an embodiment of the present invention;

FIG. 19 is a block diagram of a second more specific exemplary system in accordance with an embodiment of the present invention;

FIG. 20 is a block diagram of a system-on-chip (SoC) in accordance with an embodiment of the present invention;

FIG. 21 is a block diagram of a system-on-chip (SoC) in accordance with an embodiment of the present invention;

DETAILED DESCRIPTION

Figure 1A:
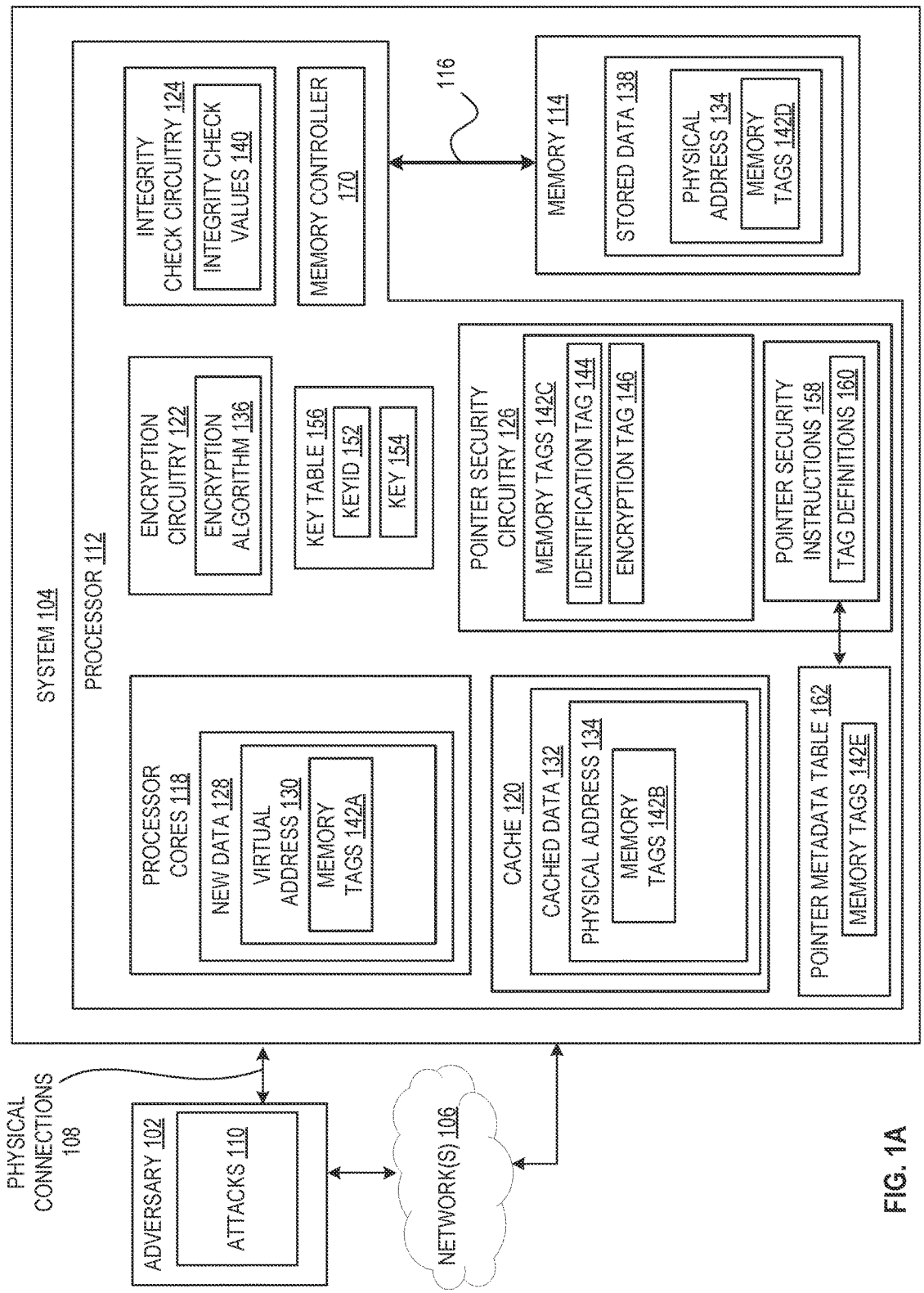
FIG. 1A is a block diagram of a computing environment that reduces the likelihood of successful side-channel analysis within a processor by providing address-based security features for memory within the processor, in accordance with at least one embodiment described herein.

In the following description, numerous specific details are set forth. However, it is to be understood that embodiments of the invention may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular structure, feature, or characteristic, but every embodiment may not necessarily include the particular structure, feature, or characteristic. Moreover, such phrases are not necessarily referring to the same embodiment. Further, when a feature, structure, or characteristic is described in connection with an embodiment, it is submitted that it is within the knowledge of one skilled in the art to affect such feature, structure, or characteristic in connection with other embodiments whether or not explicitly described.

Many processors and processor cores support capabilities to increase performance, such as caching, multithreading, out-of-order execution, branch prediction, and speculative execution. Adversaries have found ways to exploit capabilities of these processors to illicitly read data.

For example, an adversary might intentionally attempt to read data (e.g., secret data) from a memory location that should not be readable by it (e.g., out-of-bounds). The read might be allowed to proceed speculatively until it is determined whether the access is out-of-bounds. The architectural correctness of the system might be ensured by not committing any results until the determination is made, but the speculative execution might cause the microarchitectural state of the processor to change before the determination is made, and the adversary might be able to perform side-channel analysis to infer the value of the secret data from differences in the microarchitectural state of the processor. Many variants of this type of speculative attacks are possible. In one scenario, the adversary might speculatively use the secret data as part of a memory address, and, using a timing analysis to determine what memory locations are being loaded into a cache, infer the value.

As a more specific example, with a cacheline size of 64 bits, a change to any of the six least-significant bits of a memory address does not cause the address to refer to a different cacheline, but a change to the seventh least-significant bit does cause the address to refer to a different cacheline. Therefore, an adversary might repeatedly (e.g., to eliminate noise and/or achieve a statistically significant result) flush and/or fill a cache to a known or predictable state, use a speculative flow to cause a processor to speculatively access secret data, speculatively apply a bit of the secret data to the seventh least-significant bit of a known memory address stored in a register (e.g., using shift and/or other bit manipulation instructions), speculatively access their own memory space with the manipulated memory address, use a timing side-channel analysis to determine if a new cacheline loaded, and infer whether the value of the secret bit was the same as or different from the value of the seventh least-significant bit of the known memory address.

Embodiments of the invention include systems, methods, and apparatuses providing features or characteristics that may be desirable for use in a variety of computer systems for a variety of reasons, including to reduce vulnerability to attacks based on speculation, side-channel analysis; to reduce vulnerability to such analysis with less cost, in performance or otherwise, than an alternative approach; and/or to improve security in general. Embodiments provide for fine-grain memory access control mechanisms, or combinations thereof, that cannot be bypassed by speculation but do not prevent the use of speculation, thus preserving speculative performance improvements. For example, to protect against the type of analysis described in the preceding paragraph, embodiments provide for memory tagging technology and/or address encoding/encrypting, each as described below, to limit the effectiveness of adversarial efforts to infer information about secret data by attempting to use it speculatively, as a memory address or otherwise and/or to access memory locations outside of boundaries defined for validity, security, or other purposes.

Embodiments may include any and/or any combination of the following (each as may be further described below): identification/integrity tagging such that inline tag information is available to the processor or memory controller concurrent with the data access, so the processor will know immediately if the speculative memory access is incorrect and should be stopped or obscured; encryption of memory tags such that proper decryption of the data is based on knowledge of the proper tag value (key), so speculating through with an incorrect encryption tag (key identifier) will only provide useless ciphertext to the side-channel adversary and not reveal secret data for a given address; cryptographic pointers such that the assigned pointer (e.g., via malloc) available to the side-channel adversary cannot be used outside of its bounds without causing address corruption, fundamentally preventing the side-channel adversary from using such a pointer to target known memory locations for side-channel analysis (typically the processor will also catch a corrupted virtual address as it will terminate into unallocated virtual memory resulting in a page fault); a combination of techniques such that the cryptographic pointer includes the tag information (tag portion of address is also encrypted along with the actual location address information) such that a side-channel adversary can neither target memory nor independently select tag information, thus, modifying one or the other corrupts both, resulting in total chaos from the perspective of side-channel analysis; and a counter to count speculative memory access control violations such that if an adversary persists with incorrect speculation, the processor may kill a process that exceeds a specified threshold, and an OS may follow up to remediate.

Memory Tagging Technology

The disclosed embodiments include memory tagging circuitry and techniques to address existing and potential computer system security vulnerabilities. The memory tagging circuitry may be configured to prevent memory pointers (references) from being used to speculatively go beyond a valid boundary, prevent memory pointer manipulation (e.g., by adding values) that cause the pointers to access a wrong (unauthorized) data object, and increase the granularity of memory tagging to include byte-level tagging in a cache. The memory tagging circuitry may also be configured to sandbox untrusted code by tagging portions (e.g., words) of memory to indicate when the tagged portions of memory include a protected pointer. The memory tagging circuitry provides security features while enabling processors to continue using and benefiting from performing speculative operations.

FIG. 1A is a block diagram of a computing environment 100 in which the likelihood of successful side-channel analysis may be reduced by providing address-based security features for memory within a processor, consistent with embodiments of the present disclosure. The computing environment 100 includes a system 104 that reduces the likelihood of successful side-channel analysis, while concurrently enabling the processor to perform and benefit from performing speculative operations, according to an embodiment. FIG. 1 shows an adversary 102 coupled to system 104 through one or more networks 106 or one or more physical connections 108. The adversary 102 may perform one or more side-channel analysis 110 on the system 104 through the networks 106 and/or through the physical connections 108. The system 104 may include one or more of a variety of computing devices, including, but not limited, to a personal computer, a server, a laptop, a tablet, a phablet, a smartphone, a motherboard with a chipset, or some other computing device. The system 104 is configured to protect a processor against side-channel analysis using a variety of address-based security features that enable the processor to safely operate while performing speculative operations. In other words, the processor and/or associated hardware is provided with concurrent access (meaning available at the same time as the speculative data access) to additional (access control) information that allows the processor to speculate safely.

The adversary 102 may be a computer system, a person, or a combination of the computer system and a person, which may attempt one or more side-channel analysis (e.g., Spectre) on or against the system 104. The adversary 102 may use one or more networks 106 to execute the side-channel analysis 110. The adversary 102 may also use one or more physical connections 108, such as a memory interposer, memory probes, or the like, to read, modify, and/or write to one or more memory addresses within the system 104. Some of the side-channel analysis 110 may include attempting to use a pointer to speculatively access data beyond an allowed memory bounds, attempting to manipulate a pointer (e.g., add a value to a pointer to cause the pointer to point to an unintended object), and the like.

The system 104 is configured to provide a variety of memory-based security features to protect against the side-channel analysis 110. The system 104 includes processor 112, which is coupled to memory 114 through one or more communications channels 116. The processor 112 may include processor cores 118, cache 120, encryption circuitry 122, integrity check circuitry 124, and memory controller 170. The processor 112 also includes pointer security circuitry 126 that is configured to expand memory tag capabilities, reduce or prevent pointer override attacks, reduce or prevent pointer manipulation, and enable bite-granularity memory safety for the processor 112.

The processor 112 may include any number and/or combination of currently available and/or future developed single- or multi-core processing units. In embodiments, the processor 112 may represent or include a general-purpose processor, such as a Core® i3, i5, i7, 2 Duo and Quad, Xeon®, Itanium®, Atom®, or Quark® microprocessor, available from Intel® (Intel Corporation, Santa Clara, Calif.). Alternatively, the processor 112 may represent or include one or more processors from another manufacturer or supplier, such as Advanced Micro Devices (AMD®, Inc.), ARM Holdings® Ltd, MIPS®, etc. The processor 112 may represent or include a special-purpose processor, such as, for example, a network or communication processor, compression engine, graphics processor, co-processor, embedded processor, or the like. The processor 112 may be implemented as a single semiconductor die or package or as a combination of stacked or otherwise interconnected semiconductor dies and/or packages. The processor 112 may be a part of and/or may be implemented on one or more substrates using any of a number of process technologies, such as, for example, BiCMOS, CMOS, or NMOS.

The memory 114 represents one or more of a variety of types of memory that may be used in the system 104, according to an embodiment. The memory 114 may be volatile memory, non-volatile memory, or a combination of volatile memory and non-volatile memory. The volatile memory may include various types of random access memory (RAM). The non-volatile memory may include NAND memory, 3D crosspoint (3DXP), phase-change memory (PCM), hard disk drives, etc.

The processor 112 may use memory controller 170 to move data back and forth between the processor 112 and the memory 114, according to embodiments. For example, while operating one or more software programs or while executing various instructions, the processor cores 118 may generate new data 128. The processor cores 118 may use a virtual address (or linear address) 130 of the new data 128 to write the new data 128 to the cache 120 or to the memory 114. The new data 128 may be saved in the cache 120 as cached data 132, or may be added to existing cached data 132. The cached data 132 may have a physical address 134. The processor 112 may be configured to use the encryption circuitry 122 and an encryption algorithm 136 to encrypt the new data 128 and/or the cached data 132 prior to saving the new data 128 and/or the cached data 132 to the memory circuitry 114, as stored data 138; however, stored data 138 need not be encrypted and may include encrypted data, unencrypted data, or any combination of encrypted and unencrypted data. The processor 112 may also use the integrity check circuitry 124 to generate integrity check values 140 based on the new data 128, the virtual address 130, the cached data 132, and/or the physical address 134.

The memory controller 170 may write the integrity check values to the memory 114 (to facilitate corruption detection for the stored data 138) based on a key identifier (key ID) by the processor and/or the memory controller 170 may encrypt the data written to memory using a key identified by the processor (e.g. by specifying a key identifier in the physical address).

Figure 2:
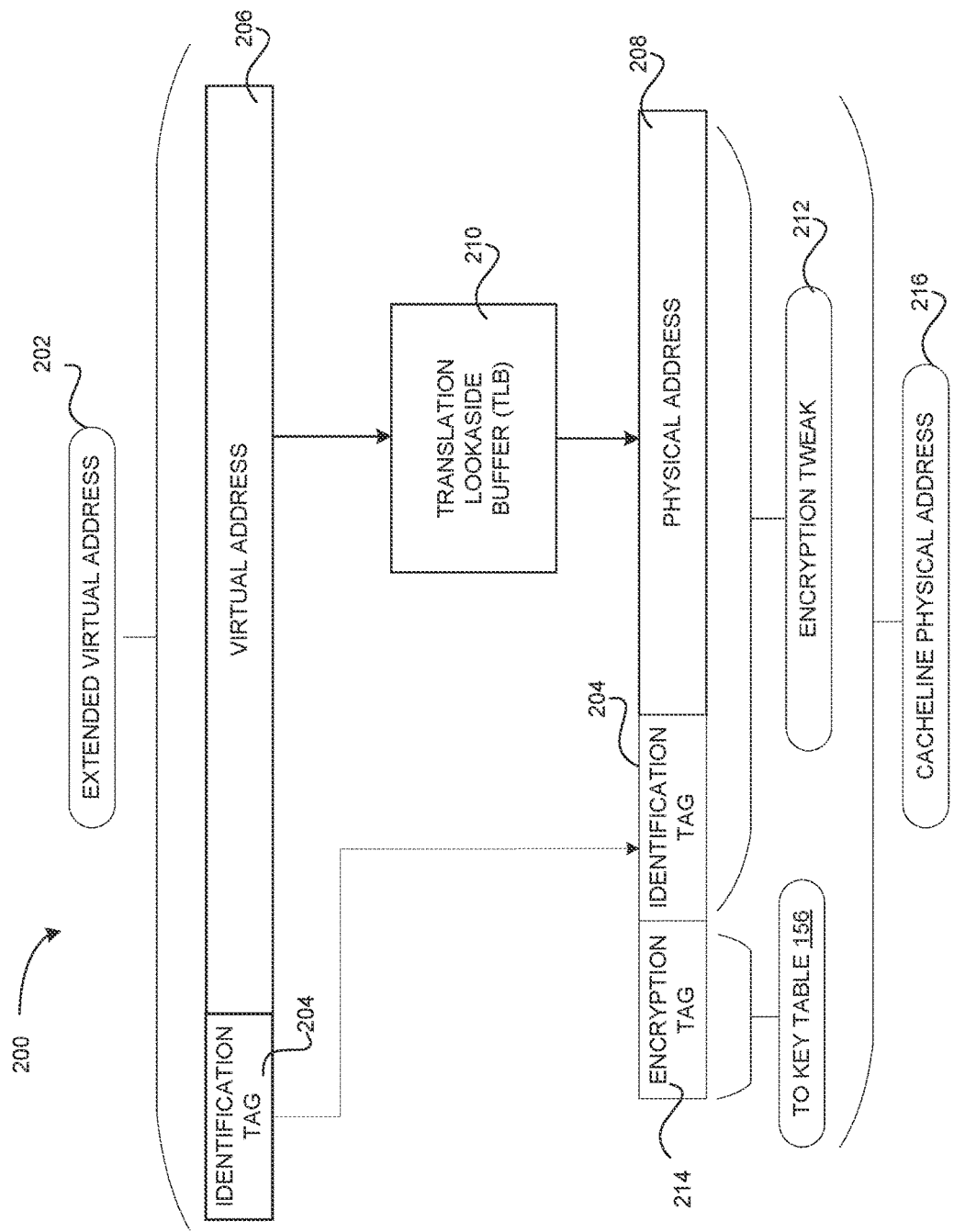
FIG. 2 is a diagram of an implementation of memory tags that may be used to secure memory address pointers against side-channel analysis, in accordance with at least one embodiment.
Figure 4:
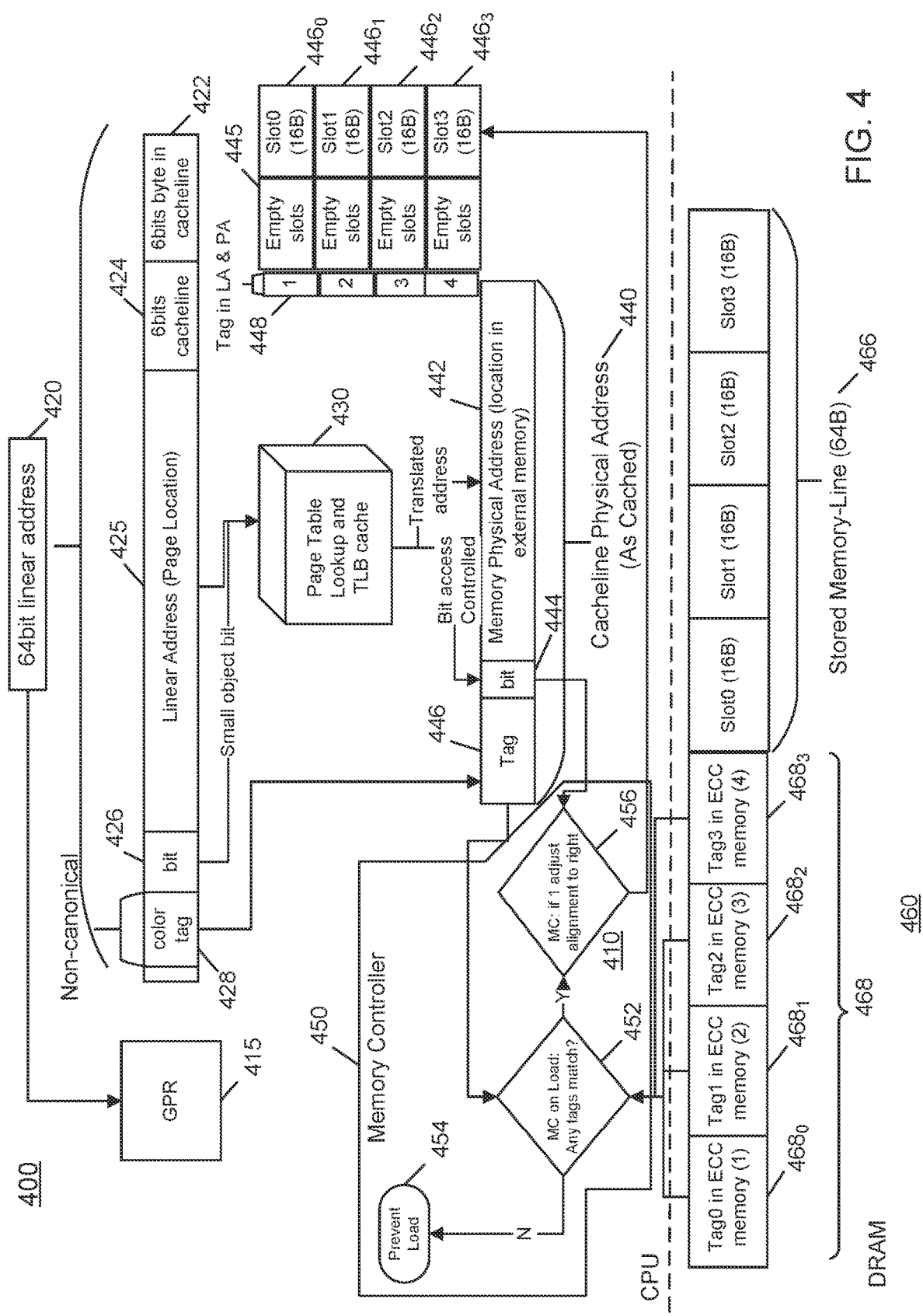
FIG. 4 is a block diagram illustrating the use of memory tags in a defense against side-channel analysis, in accordance with at least one embodiment.
Figure 5:
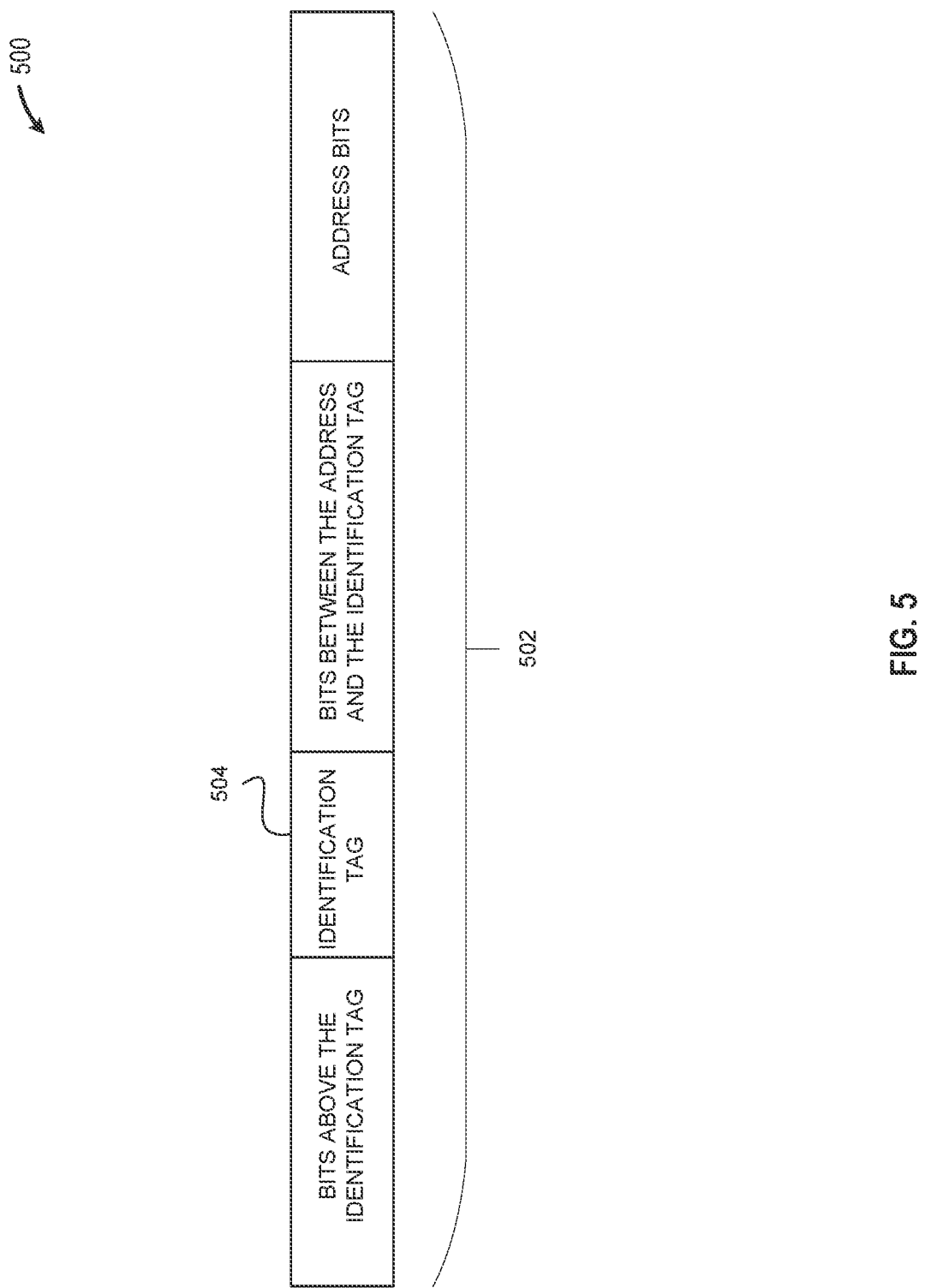
FIG. 5 is a block diagram of a virtual memory address that illustrates that an identification tag (e.g., a color tag) that may be stored in various locations within a virtual memory address, in accordance with at least one embodiment.

The processor 112 may use the pointer security circuitry 126 to provide security for data within the system 104. The pointer security circuitry 126 may be configured to detect when the virtual address 130 and/or the physical address 134 is being overwritten, detect when the virtual address 130 and/or the physical address 134 has been manipulated, provide byte-granularity memory safety, and/or provide for the use of memory tags, according to various embodiments disclosed herein. FIGS. 2, 4, and 5 illustrate various example memory tag configurations that may be identified, defined, and/or applied by the pointer security circuitry 126 to secure the system 104 from the side-channel analysis 110, according to various embodiments.

When the processor cores 118 assign (e.g., by executing a software program) the virtual address 130 to the new data 128, the pointer security circuitry 126 may define, insert, or identify one or more memory tags 142A in the virtual address 130, to associate with the new data 128 to reduce the likelihood of a successful side-channel analysis. The one or more memory tags 142A may include an identification tag 144 and/or an encryption tag 146. In some embodiments the tag may be chosen by the software that writes its data to memory. Software (e.g. a memory allocator function, such as malloc) may select a tag value and insert it into the virtual (linear) address. The hardware may interpret that tag value or encode or translate it and/or pass it through to a physical address.

The virtual address 130 for the new data 128 may include the identification tag 144 to provide access control for the new data 128. The identification tag 144 may be referred to as a color, a cryptographic color, a memory color, a tag color, a key ID, etc. The pointer security circuitry 126 may be configured to define where within the virtual address 130 the identification tag 144 resides or is defined. For example, the pointer security circuitry 126 may define the identification tag 144 as the eight most significant bits in the virtual address 130. The identification tag 144 may be defined as, for example, bits 56-62 (i.e., seven bits) of bits 0-63 of the virtual address 130, assuming, as an example, that the length of the virtual address 130 is 64 bits. Other embodiments may use larger or smaller tag sizes and/or larger or smaller virtual address sizes (e.g., 128 bits).

The pointer security circuitry 126 may use the identification tag 144 in a variety of ways to provide security to the new data 128. For example, the pointer security circuitry 126 may use the identification tag 144 as a tweak or as part of a tweak (e.g., an input to a cipher, in addition to the plaintext data, that results in different ciphertext data for different tweak values) in the encryption algorithm 136. In an embodiment, the identification tag 144 is combined with a subset of the virtual address 130 to define a tweak that may be used by the encryption algorithm 136 when encrypting the new data 128.

The virtual address 130 for the new data 128 may include the encryption tag 146 to provide security for the new data 128. The pointer security circuitry 126 may be configured to define where within the virtual address 130 the encryption tag 146 resides or is defined. For example, the pointer security circuitry 126 may define the encryption tag 146 as the three most significant bits in the virtual address 130. The encryption tag 146 may be defined as, for example, bits 59-62 (i.e., four bits) of bits 0-63 of the virtual address 130, assuming, as an example, that the length of the virtual address 130 is 64 bits. The encryption tag 146 may be a representation of a key ID 152 that is used to look up the encryption key 154 within a key table 156, by the encryption circuitry 122. The encryption tag 146 may also or alternatively be identified using other techniques, e.g., may be defined within one or more bits in the physical address 134. It may be copied or translated from the virtual address and into the physical address such that the key ID may be communicated to the memory encryption circuitry. Embodiments may provide for use of the key ID to contribute to defenses against speculative side channel analysis because if a wrong memory encryption tag is used the data will not be revealed (it will be decrypted into random bits), so speculation based on this random data does not reveal any secrets to the adversary on side-channel analysis.

The pointer security circuitry 126 may also include pointer security instructions 158 that at least partially provide tag definitions 160. The pointer security instructions 158 may include instructions or operations that may be used by the pointer security circuitry 126 or the processor 112 to add a pointer in accordance with the tag definitions 160. The tag definitions 160 may define one or more of the length, location, and use of one or more of the identification tag 144 and/or the encryption tag 146. In embodiments, the instructions may be used to set the corresponding tag value in memory and/or to read the tag values from memory and may be limited to use by privileged software (e.g., OS kernel or VMM).

The pointer security circuitry 126 may use a pointer metadata table 162 to store, update, and retrieve the memory tags 142E and/or the tag definitions 160.

When the processor 112 writes the new data 128 to the cached data 132 with the physical address 134, the pointer security circuitry 126 may define, insert, or identify one or more memory tags 142B in the physical address 134, to associate with the cached data 132 to reduce the likelihood of a successful side-channel analysis. The one or more memory tags 142B embedded within the physical address 134 may include one or more of the identification tag 144 and/or the encryption tag 146. The physical address 134 may include fewer, more, or different portions of the memory tags 142B than are used or associated with the virtual address 130.

For the purpose of speculation attack prevention, since it is the software function doing the memory write that "owns" the data being written, the write may assign the associated identification tag (e.g., a write-for-ownership, or my-data-my-tag), the tag assignment starts with a software flow as applied to the corresponding virtual (linear) address used to write the data. The hardware is responsible for performing the read memory access control based on the tag value. In the identification tag scenario, the hardware is comparing a tag value that was originally written with the data to a tag value in the address of a memory access request (a memory load). If the tags match, then then the memory access may proceed (the requestor knew the correct identification tag value to use). Similarly, for the encryption tag, the requestor knows the correct key to use (the key that was used to encrypt on writing the data to memory).

Figure 1B:
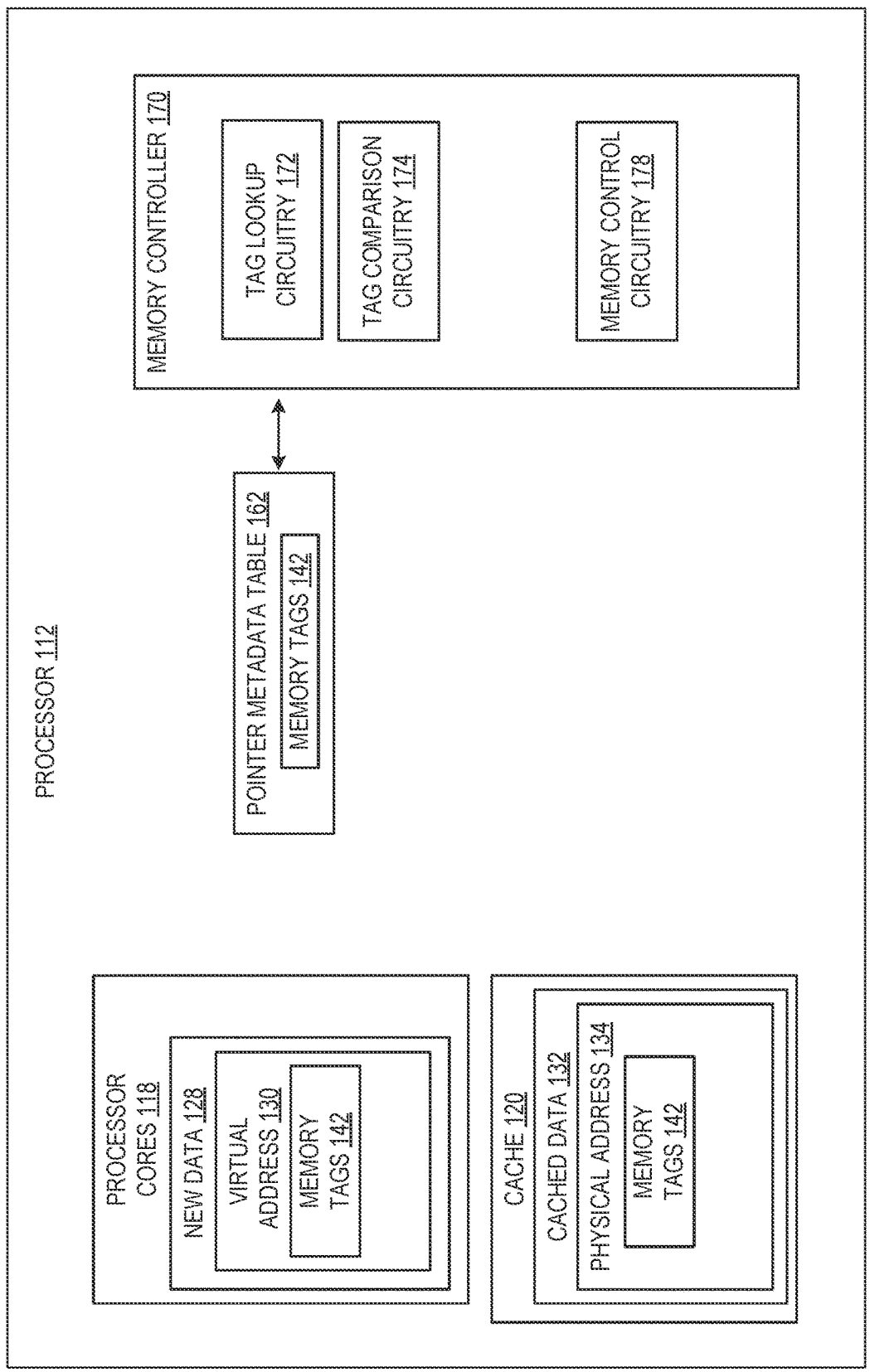
FIG. 1B is a block diagram of a processor in accordance with at least one embodiment.

FIG. 1B is a block diagram of the processor 112 of FIG. 1A, showing processor cores 118, cache 120, pointer metadata table 162, and a more detailed depiction of memory controller 170, according to an embodiment. Tag lookup circuitry 172 may be to lookup a memory tag associated with a physical address, according to embodiments such as method 300 of FIG. 3. Tag comparison circuitry 174 may compare a memory tag associated with a physical address 130 to a memory tag associated with a virtual address 130, according to embodiments such as methods 300 of FIG. 3. Memory control circuitry 178 may represent any other circuitry to perform memory control operations according to any approach.

FIG. 2 illustrates a memory address translation diagram 200 of an implementation of memory tags that may be used to secure memory address pointers against side-channel analysis, according to an embodiment. The memory address translation diagram 200 illustrates an extended virtual address (or linear address) 202 including an identification tag 204, which occupies one or more bits (e.g., non-canonical bits), and a virtual address 206, which occupies a subset of the extended virtual address 202. The extended virtual address 202 may be 64 bits. The identification tag 204 may occupy one or more most significant bits, or other bits within the extended virtual address 202. The virtual address 206 is translated to a physical address 208 through a translation lookaside buffer (TLB) 210, as illustrated, or through the walking of page tables. The identification tag 204 is appended to the physical address 208. The physical address 208 and the identification tag 204 may be combined to form or define an encryption tweak 212 which be applied to an encryption algorithm as described below. An encryption tag 214 may be appended to the identification tag 204 and the physical address 208 to identify one or more encryption keys through the key table 156 (shown in FIG. 1). The identification tag 204, the physical address 208, and the encryption tag 214 may be combined to define a cache line physical address 216. Bit positions and/or tag sizes may vary from embodiment to embodiment. The bigger the tag size, the more possible tag values, and the harder it is for an adversary to guess.

In embodiments, the memory tag architecture illustrated in the memory address translation diagram 200 may employ different sizes of identification tag 204 and/or encryption tag 214 to adjust the difficulty of guessing which memory tag (e.g., identification tag 204 and/or encryption tag 214) is associated with a particular memory address pointer and/or a particular object.

Memory tagging works similarly to multi-key total memory encryption (MKTME), where physical address bits (or other cached metadata) hold tag bits (e.g., the Key Identifier KeyID or Key Domain). Software (e.g., a memory allocator library such as malloc in glibc) chooses tags may select the tag bits within a linear address space by setting non-canonical bits to the tag value. Hardware can bypass paging structures for these translations, allowing the linear address to directly set tag bits in the physical address. Embodiments may include checking tag meta-data between external memory and the processor caches on a load operation, providing a side-channel defense mechanism as tags can be checked and validated before cache contents are affected. Tagging operations described herein may be performed by hardware referred to as a "memory controller" or "memory tag controller," which more generally refers to memory controller subsystem hardware, potentially located in a variety of locations of a memory subsystem to handle cacheline data tagging according to embodiments.

Figure 3:
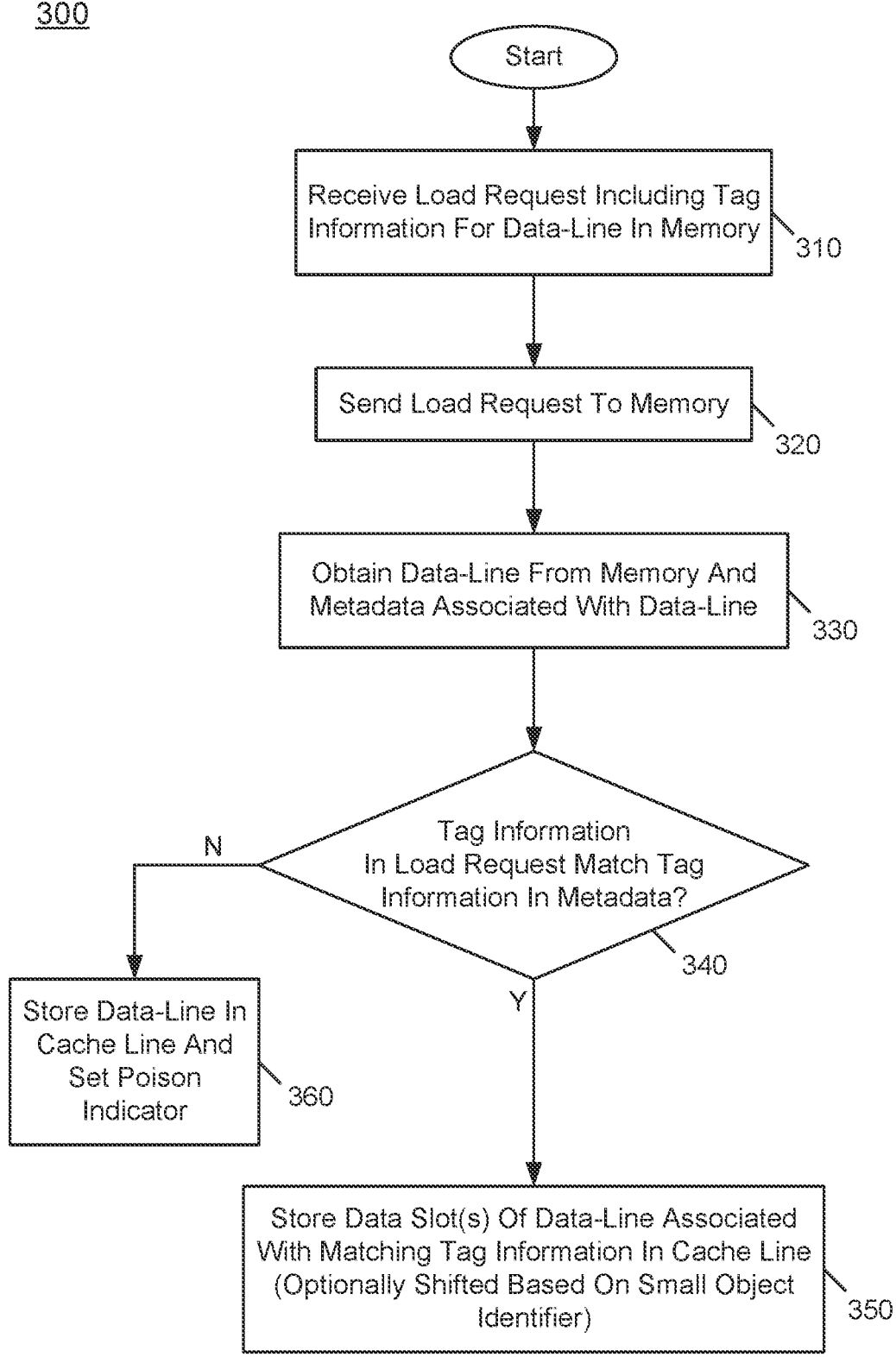
FIG. 3 is a flow diagram of a method for using memory tags in a defense against side-channel analysis, in accordance with at least one embodiment.

FIG. 3 shows is a flow diagram of a method 300 for performing a load operation according to an embodiment of the present invention. Method 300, in an embodiment, may be performed by a memory controller or other memory execution circuitry. As such, method 300 may be performed by hardware circuitry, firmware, software, and/or combinations thereof.

As illustrated, method 300 begins with the receiving of a load request including tag information for a data-line in memory (block 310). This load request may be a request from any given component to read at least one data slot from a data-line. In embodiments, this data request may include a tag identifier included in a non-canonical portion of an address of the load request. In response to this load request, the memory controller sends the load request to memory (block 320). For this load operation, the memory controller may receive the tags included in metadata associated with the memory-line along with the data for the requested address from memory (block 330). The memory controller (e.g., by tag comparison circuitry 174 in memory controller 170) may determine whether one or more tags of the tag information matches a tag of the address of the memory request (diamond 340). If so, one or more portions, e.g., data slots, may be stored in a cacheline, along with storing the tag identifier itself, e.g., in metadata of the cacheline.

If a matching tag is not found on a load, control passes to block 360 where the memory controller may, in an embodiment, prevent loading of a cacheline, or in an other embodiment, load the cacheline, but with random or garbage data (i.e., not indicative of the data stored at the corresponding physical address in memory), which may provide, by not revealing whether there was an identification tag match, a defense against an adversary attempting to guess identification tag values.

Referring now to FIG. 4, shown is a high-level arrangement of a system 400 including a processor (CPU) 410 and an associated memory (DRAM) 460. As illustrated, assume a load or read request is generated. Software may request data to be read using a 64-bit linear address 420 which, as shown, includes various portions including a least significant portion 422 (e.g., 6 bits to identify a byte within a cacheline), another portion 424 to identify a cacheline, a linear address portion 425 to identify a page location, and a small object indicator 426, e.g., a small object bit, which when set identifies that the request is for less than a cacheline width. For example, this small object address bit may be set by page table entries corresponding to pages that are part of a small object region of a heap. As further illustrated, a non-canonical portion of the address may include a tag 428 as described herein. Note that linear address portion 425 may be used to perform a lookup within page table and TLB caching structures 430 to obtain a memory physical address 442. Assume that this physical address corresponds to memory-line 466 also shown in FIG. 4, which includes four 16B slots (slot 0-slot 3) each having a corresponding tag 4680-3 stored in ECC (or a table in) memory 468.

When each of these stored tags is of a different tag identifier value, this means that each slot is associated with a different tag and thus as further illustrated in FIG. 4, when loaded and stored into a cache 445, each slot may be stored into a different cacheline (e.g., in a right hand side of the cacheline as shown), with its corresponding tag identifier 448 in the PA address for the cacheline. Thus, as illustrated in FIG. 4, with tag identifiers 4680-4683 each including a different value (namely values 1-4), each corresponding data slot in memory-line 466 may be stored in a different cacheline 446, each stored in association with its corresponding tag identifier in an address or metadata portion of cache 445 associated with the cacheline.

As further illustrated, memory controller operations to be performed on a load are shown. Of course, in other cases, this (memory tag controller) functionality could be performed between any of the caching layers, e.g., between the L2 cache and LLC, or between the L1 and L2 cache, and so on. As seen, a memory controller 450 may determine whether the tag of the address matches any of the identified tags in the tag information obtained from memory (diamond 452). If so, it may also be determined whether the small address object indicator is set (diamond 456). If it is, memory controller 450 may cause the data slot associated with the matching tag to be stored in a given cacheline aligned to the right-hand side as illustrated. Data shifting in a cacheline with out-of-bounds detection may occur when the next byte to be read or written goes beyond the end of the cacheline. And note that data may be aligned/shifted either to the beginning or end of the cacheline depending on whether one wishes to catch an underflow read or an overflow read error. Depending on use cases, data slots may be shifted to one end or the other. For example, for a stack usage, shifts may be to the most significant side. If there is an overflow by pushing all the data to the end of the cacheline, a buffer overflow may be detected on a byte granularity because one more byte is walked beyond the end of the buffer, and another cacheline is read. When this subsequent adjacent cacheline read occurs, it is provided to the memory controller for the adjacent cache line, which determines that the tag does not match that last one, thus detecting the violation. Which direction the shifts occur for a particular cacheline may be configured as part of the tag configuration stored in (e.g., ECC) memory or, alternatively, may be indicated by another address bit akin to the small object indictor bit indicating the expected direction of the shift operations.

If there is no match between the tag of the address and any of the tag identifiers received from the memory on a memory load, memory controller 450 may, in an embodiment, prevent loading of a cacheline, or in an other embodiment, load the cacheline, but with random or garbage data (i.e., not indicative of the data stored at the corresponding physical address in memory), which may provide, by not revealing whether there was an identification tag match, a defense against an adversary attempting to guess identification tag values.

FIG. 5 illustrates a block diagram 500 of an extended virtual memory address 502 that illustrates that an identification tag 504 (e.g., a color tag) may be stored in various locations within the virtual memory address. The identification tag 504 may occupy one or more bits within the virtual memory address 502 such that the virtual memory address 502 includes one or more bits above the identification tag 504 and one or more bits between the identification tag and the portion of the virtual memory address that is translated into the physical address (e.g., through a translation lookaside buffer).

Address Encoding/Encrypting

Returning to FIG. 1A, the processor 112 may be configured to encrypt and decrypt virtual/linear addresses (e.g., virtual address 130), any portion thereof, any other addresses (direct or indirect), and/or any portions thereof, also or instead of encrypting and decrypting new data 128, cached data 132, and/or stored data 138, using encryption circuitry 122 for example.

Figure 6:
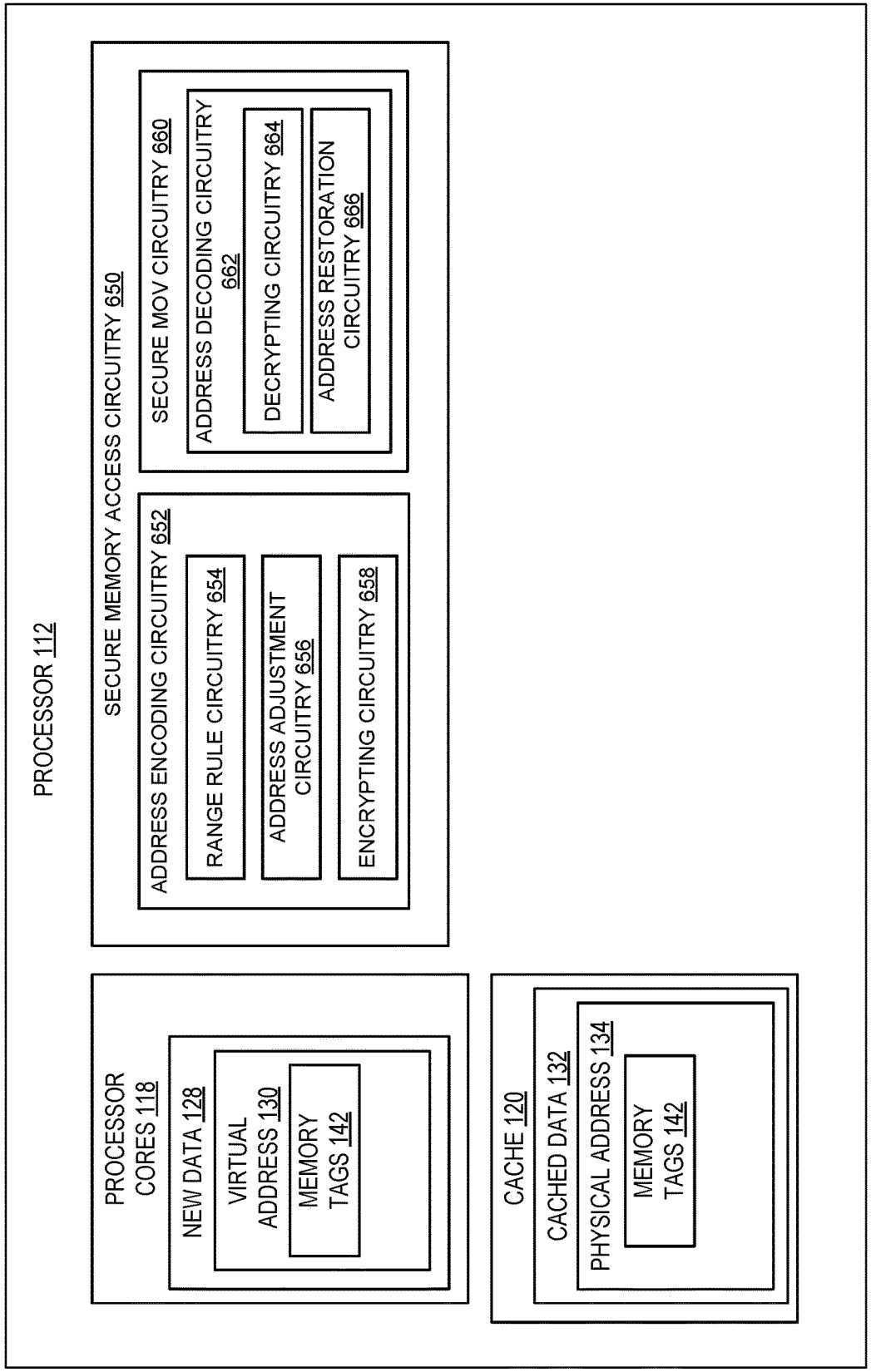
FIG. 6 is a block diagram of a processor in accordance with at least one embodiment.

FIG. 6 is a block diagram of another representation of the processor 112 of FIG. 1A and FIG. 1B, showing processor cores 118, cache 120, and secure memory access circuitry 600, according to an embodiment in which virtual addresses may be encrypted. Secure memory access circuitry 600 may use or include encryption circuitry as represented by encryption circuitry 122 as shown in FIG. 1A, or may use or include other encryption circuitry, but is shown for convenience as including encrypting circuitry 658 and decrypting circuitry 654.

In an embodiment, the secure memory access circuitry 600 utilizes metadata about an address (e.g., virtual address 130), which is encoded into memory tag bits (e.g., memory tags 142A) or other bits within or associated with the address (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the address. For example, the metadata encoding and decoding provided by the secure memory access circuitry 600 may prevent the address from being manipulated to cause a buffer overflow, and/or may prevent program code from accessing memory that it does not have permission to access.

In an embodiment, secure memory access circuitry 600 includes address encoding circuitry 652, which may be invoked when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded address, which points to the allocated memory, is encoded with the address metadata.

The address metadata may include valid range metadata. The valid range metadata may allow executing programs to manipulate the value of the address within a valid range (e.g., by performing pointer arithmetic on the plaintext portion of the pointer), but may corrupt the address if the memory is accessed using the address beyond the valid range (e.g., by affecting the ciphertext portion of the pointer or other bits of the pointer that are used as part of the tweak input to the cipher). Alternatively or in addition, the valid range metadata may be used to identify a valid code range, e.g., a range of memory that program code is permitted to access (e.g. the encoded range information may be used to set explicit ranges on registers). Other information that may be encoded in the address metadata includes access restrictions on the address (e.g., whether the address may be used to write, execute, or only read the referenced memory).

In an embodiment, secure memory access circuitry 600 includes address decoding circuitry 662, which may be invoked to verify the encoded metadata on memory read and write operations that utilize processor instructions such as MOV, where a general purpose register is used as a memory address to read a value from memory or to write a value to memory (e.g., load/store), as well as on other operations that involve the "use" of memory (such as control transfer instructions, e.g. CALL/JMP etc.) and/or any instruction that can take a memory operand. The indirect (e.g. encoded virtual/linear) memory address used for the memory access is first decoded and/or decrypted by the processor to get the correct virtual/linear memory address.

In an embodiment, on (or during) a memory allocation operation (e.g., a "malloc"), memory allocation circuitry (e.g., memory management code within a privileged system component in system memory) may allocate a range of memory for a buffer and return an address and the corresponding metadata (e.g., range and/or permission metadata). For example, the memory allocation circuitry may encode plaintext range information in the address (e.g., in the unused/non-canonical bits, prior to encryption), or supply the metadata as one or more separate parameters to the instruction, where the parameter(s) specify the range and/or code permission information. Thus, according to an embodiment, the memory allocation circuitry may invoke the address encoding circuitry 652. The address encoding circuitry 652 includes range rule circuitry 654 and address adjustment circuitry 656, which encode the address with the metadata (e.g., range and/or permission metadata) and an "adjustment," as described below. The address encoding circuitry 652 may store the metadata in an unused portion of the address (e.g., non-canonical bits of a 64-bit address).

To determine valid range metadata, the range rule circuitry 654 may select the valid range metadata to indicate an upper limit for the size of the buffer referenced by the address. The address adjustment circuitry 656 may adjust the valid range metadata as needed so that the upper address bits (e.g., most significant bits) of the addresses in the address range do not change as long as the address refers to a memory location that is within the valid range indicated by the range metadata, which may enable the address to be manipulated (e.g., by software performing arithmetic operations, etc.) but only so long as the manipulations do not cause the address to go outside the valid range (e.g., overflow the buffer). In other words, the processor will take the adjustment value and add it to the address (pointer) value and, as long as this operation does not affect the ciphertext (or bits used as part of the tweak) of the address, the memory access is allowed. In embodiments, the adjustment value itself may be encrypted as part of the encoded address to prevent a speculative adversary from controlling the adjustment value of an address.

The address encoding circuitry 652 may use the valid range metadata to select a portion of the address to be encrypted. The encrypting circuitry 658 may encrypt the selected portion of the address (and the adjustment and/or an identification tag, in some embodiments), using a secret key (e.g., key 154 in FIG. 1A) and a tweak, as described further below. On a memory access operation (e.g., a read, write, or execute operation), the address decoding circuitry 662 may decode the previously-encoded address. To do this, the decrypting circuitry 664 may decrypt the encrypted portion of the address (and in some embodiments, the encrypted adjustment and/or encrypted identification tag) using the secret key and the tweak, as described further below.

The address restoration circuitry 666 may return the address to its original (e.g., canonical) form, in order to restore the original value of the address (e.g., the true, original linear memory address). To do this, the address restoration circuitry 666 may remove the valid range metadata encoded in the unused bits of the address (e.g., return the unused bits to their original form). If the address decodes successfully, the memory access operation completes successfully. However, if the encoded address has been manipulated (e.g., by software) so that its value falls outside the valid range indicated by the range metadata (e.g., overflows the buffer), the address will be corrupted as a result of the decrypting process performed by the decrypting circuitry 664. A corrupted indirect address will raise a fault (e.g., a general protection fault). In this way, the secure memory access circuitry 650 enables the processor to provide access control and address security against buffer overflow attacks and similar exploits.

Figure 7:
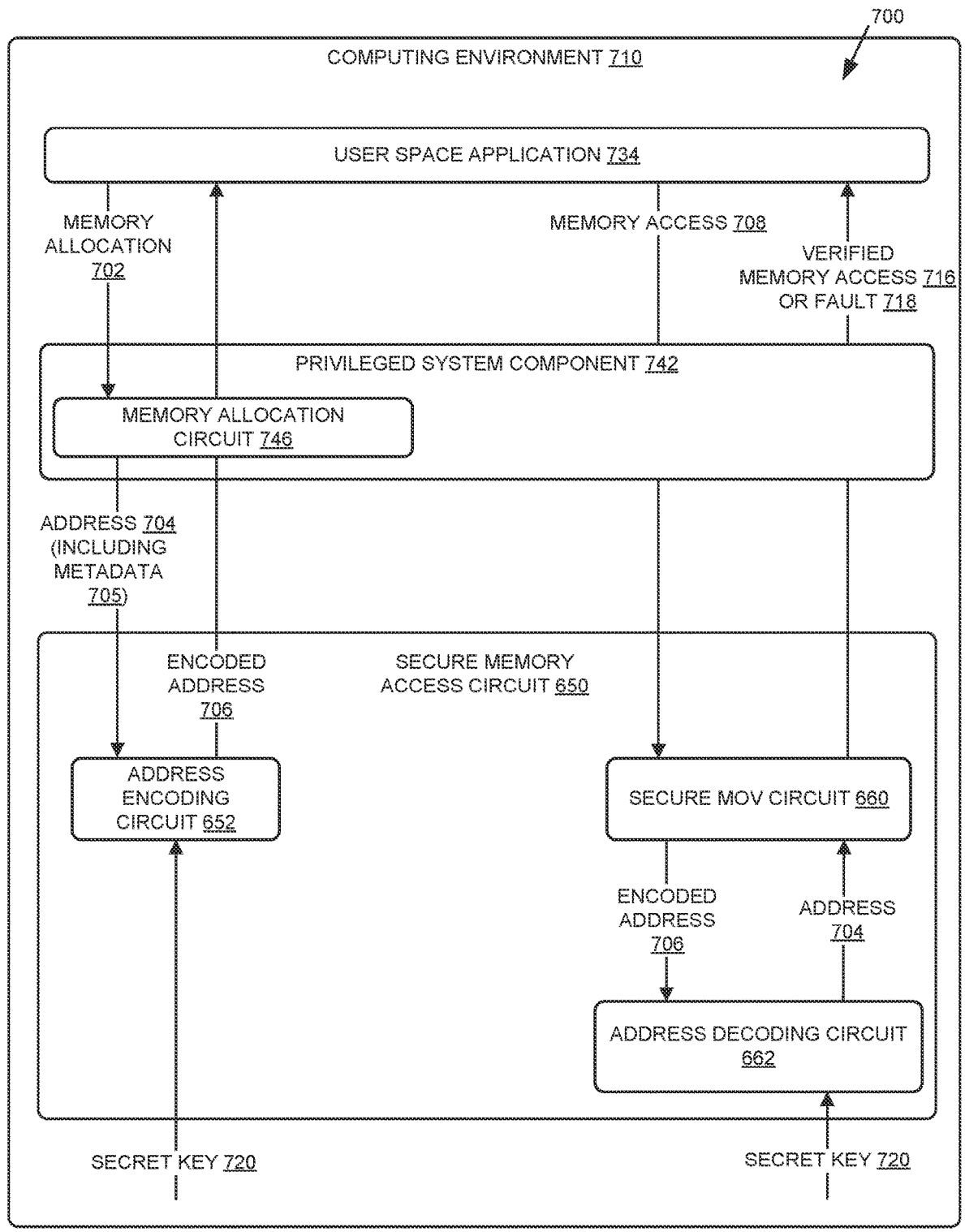
FIG. 7 is a diagram of a computing environment, illustrating an application of the secure memory access logic of FIG. 6 according to an embodiment.

Referring now to FIG. 7, in some embodiments, a computer system may establish a computing environment 710 during operation (e.g., native and/or virtual runtime or "execution" environments). The various modules depicted in the environment 710 may be embodied as hardware, firmware, software, or a combination thereof. In the environment 710, the user space application 734 (or the privileged system component 742, e.g., in loading a user space application 734) may, from time to time, during the operation of the computer system, issue a memory allocation 702. The memory allocation 702 may be translated (e.g., compiled or interpreted), as needed, by the memory allocation circuitry 746 of the privileged system component 742 before being passed on to the processor (e.g., processor 112). In the processor, the address encoding circuitry 652 is invoked in response to the memory allocation 702 (e.g., in place of a conventional "malloc" instruction). Whereas a conventional malloc instruction simply allocates memory and returns an (unsecured) pointer, the address encoding circuitry 652 encodes the address 704, including metadata 705 (e.g., the range and/or permission information, either already plaintext encoded in the address—without encryption yet applied by the processor—or as a separate parameter to the instruction specifying the range), as described herein, and returns an encoded address 706.

Similarly, the user space application 734 or the privileged system component 742 may issue a memory access 708 from time to time, which may be handled by the processor as a processor instruction that reads from memory and writes to a register or reads from a register and writes to memory (e.g. a MOV instruction). Using the MOV instruction as an example, the secure move circuitry 660 performs the memory access only after successfully invoking the address decoding circuitry 662. While the secure move circuitry 660 and the address decoding circuitry 662 are shown as separate modules in FIG. 6 and FIG. 7, it should be understood that the address decoding circuitry 662 can be incorporated into the secure move circuitry 660 or may be implemented separately. Further, it should be understood that the address decoding circuitry 662 may be incorporated into or referenced by other types of instructions, alternatively or in addition to the MOV instructions (e.g., call, JMP, etc.). For example, control transfer instructions such as call and JMP may load the encoded address for the code to execute into the processor's program counter register (e.g. instruction pointer or the RIP, where the RIP is the instruction pointer register using instruction relative addressing in 64-bit code). The instruction pointer register may then be queried by a program and as a result, the current program counter address will be the encoded form (offset to the current program counter location).

If the address decoding circuitry 662 successfully decodes the encoded address 706, the original address 704 is returned to the privileged system component 742 and the memory access is completed (716), or program execution begins at the new program counter location (in the case of control flow changes). If the encoded address 706 does not successfully decode, a fault is raised (718).

Figure 8A:
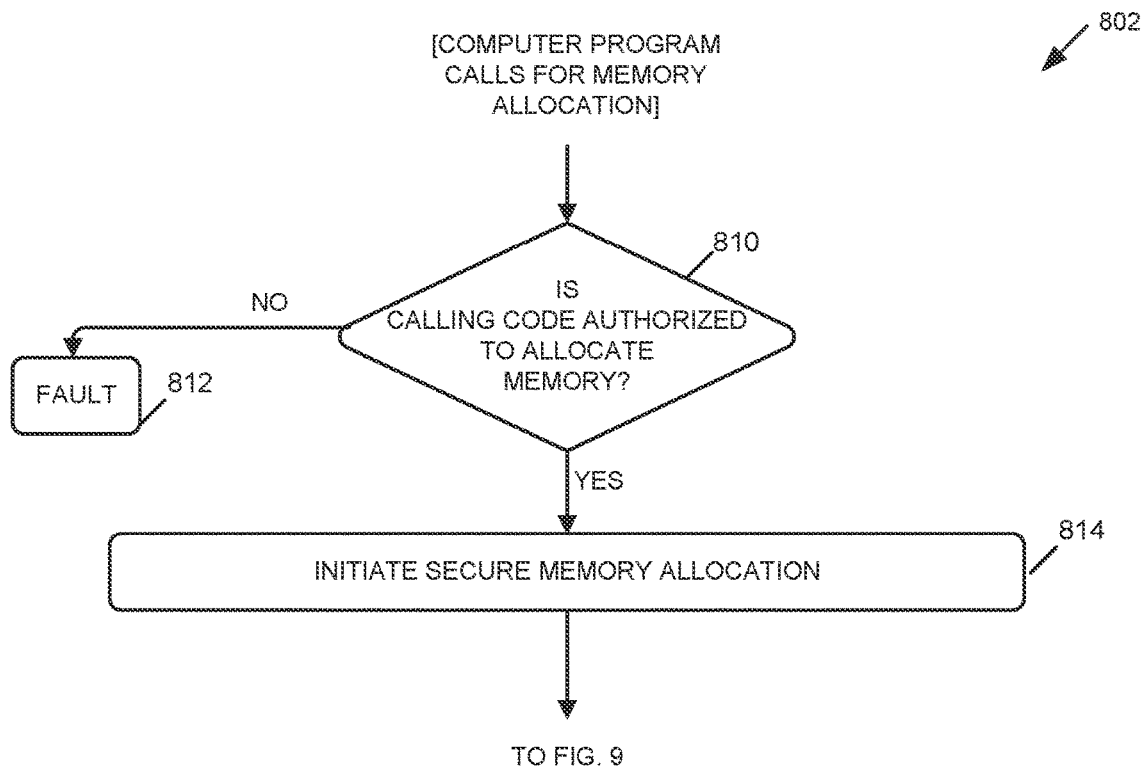
FIG. 8A is a flow diagram of at least one embodiment of a method for initiating a memory allocation operation during execution of a computer program.
Figure 8B:
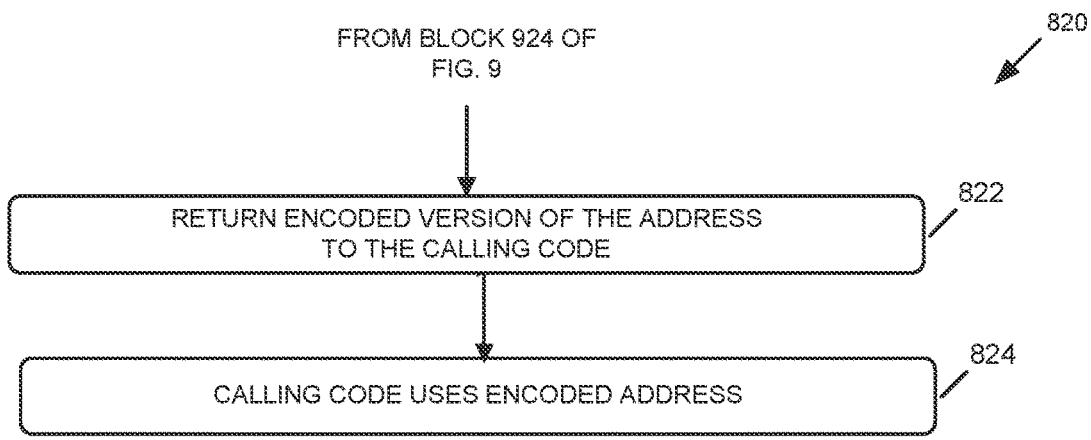
FIG. 8B is a flow diagram of at least one embodiment of a method for continuing the memory allocation operation of FIG. 8A.

Referring now to FIGS. 8A and 8B, examples of methods 802 and 820 for performing a memory allocation process, are shown. Portions of the methods 802 and 820 may be executed by hardware, firmware, and/or software of a computer system (e.g., by the privileged system component 742 executing the memory allocation circuitry 746). In FIG. 8A, the method 802 begins in response to a call for memory allocation from calling code (e.g., the privileged system component 742 or the user space application 734). In block 810, the computer system determines whether the calling code is authorized to allocate memory. To do this, the computer system may utilize a set of processor registers to log the locations of recently-taken code branches, e.g., the last branch record (LBR). For example, to determine the calling code (e.g., the code that called a function), the function can query the LBR to see the branch history. Alternatively, the function may query the call stack for the return address (but the return address on the stack may not be as secure as data stored in processor registers). If the computer system determines that the calling code is not authorized to allocate memory, a fault is raised in block 812. If the computer system determines that the calling code is authorized to allocate memory, the computer system proceeds to block 814 and initiates secure memory allocation using the techniques disclosed herein. Accordingly, the computer system proceeds from block 814 to the beginning of the method 900, shown in FIG. 9 and described below.

In FIG. 8B, the method 820 begins in response to the output of an encoded address at block 924 of the method 900. In block 822, the computer system returns the encoded version of the address (e.g., the encoded address 706) to the calling code that initiated the memory allocation in block 814 of FIG. 8A. In block 824, the calling code uses the encoded address to access the allocated memory (e.g., buffer). In doing so, the calling code may alter or modify the encoded address by, for example, performing arithmetic operations on the encoded address. Thus, a subsequent read or write operation of the calling code may trigger the execution of the method of FIG. 10, described below.

Figure 9:
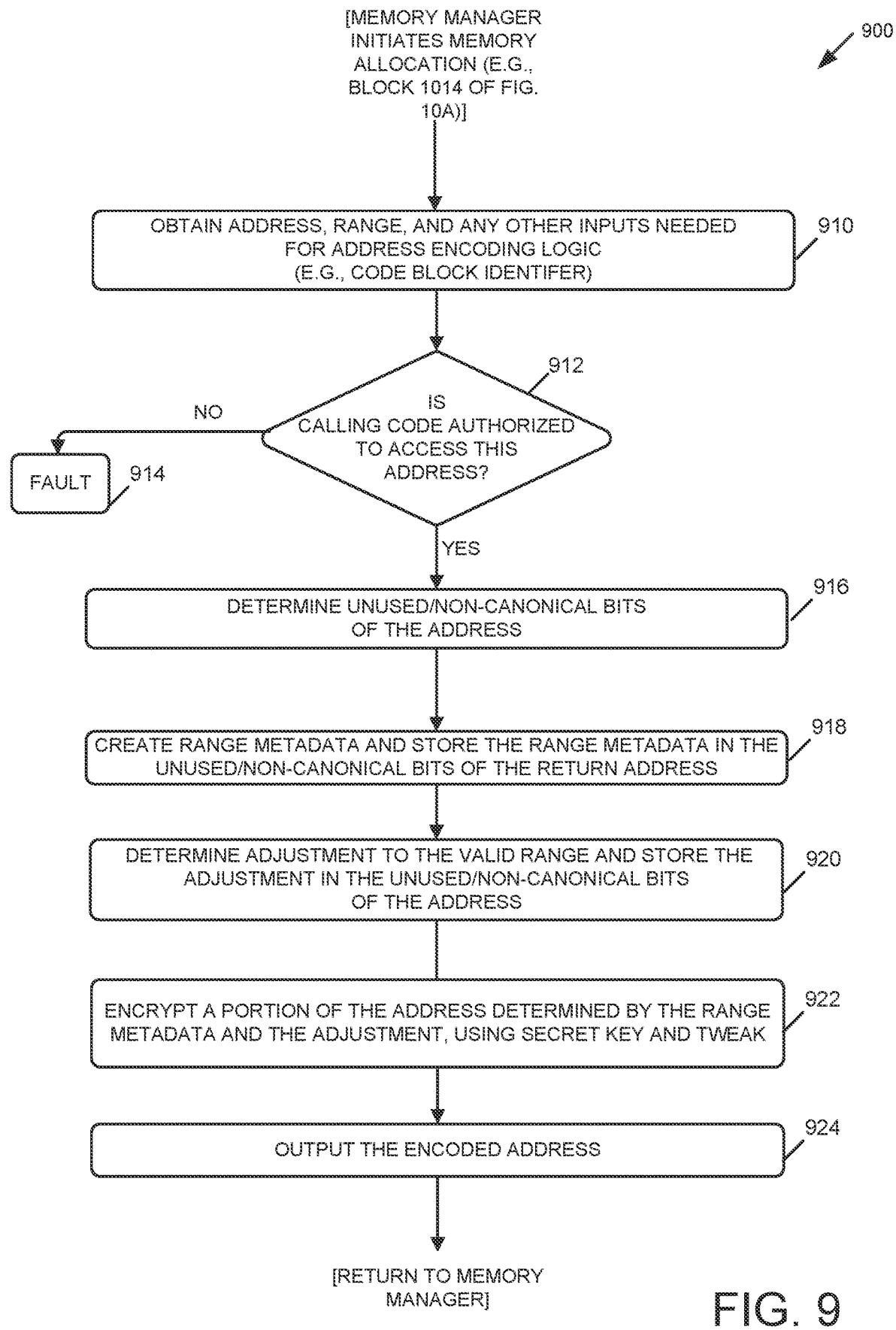
FIG. 9 is a flow diagram of at least one embodiment of a method for providing security for an indirect address.

Referring now to FIG. 9, an example of a method 900 for securing an address is shown. Portions of the method 900 may be executed by hardware, firmware, and/or software of the computer system (e.g., by the processor 112 invoking the address encoding circuitry 652). The method 900 begins in response to a memory allocation (e.g., by a memory manager module in block 814 of FIG. 8A). In block 910, the computer system obtains the address, address range, and other inputs needed to encode the address (e.g., a code block identifier or instruction pointer, as described below). In block 912, the computer system determines whether the calling code (e.g., the code initiating the memory allocation in block 810 of FIG. 8A) is authorized to access the indirect address received in block 910 (e.g., address 704). To do this, the computer system may perform an access control check by verifying the instruction pointer or caller privilege level information for the calling code, which may be obtained from, for example, a heap manager of a memory manager module. If the computer system determines that the calling code is not authorized to access the address, a fault is raised (914). If the computer system determines that the calling code is authorized to access the address, the computer system proceeds to block 916. In block 916, the computer system determines the unused (e.g., non-canonical) address bits of the address to perform the address range encoding. To do this, the computer system may simply use the higher (e.g., most significant) unused/non-canonical bits of the address. It should be noted that the encoded addresses do not need to be architecturally non-canonical. Rather, the unused/non-canonical addresses may simply be a range of memory set aside by, for example, the privileged system component 742, to enable the address encoding as disclosed herein.

In block 918, the computer system creates the metadata (e.g., valid range and/or permission data) and stores the metadata in the unused/non-canonical bits of the address selected in block 916. Illustratively, the metadata indicates an upper limit on the size of the buffer pointed to by the address. To create the metadata, the computer system converts the address values to a center location in which the most significant canonical address bits do not change for the valid memory range. In some embodiments, the range metadata includes an "exponent" to determine the 2's power of the memory range size. In some cases, an "adjustment" is used to force values to the end of the 2's power range as described below. In other embodiments, the adjustment may be used to force the buffer to the beginning of the 2's power range when buffer "underflow" needs to be addressed (as opposed to buffer "overflow"). Using the exponent metadata, any 2's power memory range may be defined (e.g., 2, 4, 8, 16 . . . 2^64).

The following is a simple example of range metadata encoding. The addresses 0000b-0011b fit the range 0-3 where the upper two bits do not change. However, if a pointer is modified to go to the index 4, one of the upper bits will change. Accordingly, the valid range metadata may be encoded as [2] (for the upper two bits to encode a range of 4) and the valid range metadata may be stored in the higher non-canonical bits, e.g., "[2] 00xxb." In this example, the exponent would be 2 bits in size (e.g., values [1-4]), to cover the 4-bit addresses used in the example. Table 1 below illustrates a number of additional, simplified examples.

TABLE 1

Address encoding examples.

| Real Address Range | Size | Encoded Address | Comment |
|---|---|---|---|
| 1001 b-1100 b | 4 bytes | [2] {3} 11xx | Adjust + 3 to fit all in 11xxb |
| 1001 b-1101 b | 5 bytes | [3] {1} 1xxx | Adjust + 1 to end of range |
| 1110 b-1111 b | 2 bytes | [1] {0} 111x | Fits in lowest power of 2 |
| 1101 b-1110 b | 2 bytes | [1] {1} 111x | Adjust + 1 to fit all in 111xb |
| 0000 b-1111 b | 16 bytes | [4] {0} xxxx | Full range |
| 1010 b-1010 b | 1 byte | [0] {0} 1010 | Exact match |
| 1011 b-1101 b | 3 bytes | [2] {2} 11xx | Adjust + 2 to end of range |

In Table 1, the encoded address is represented using a format that is similar to a floating-point format. In the encoded addresses in the third column of Table 1, the number in brackets, e.g., [2], is the exponent or valid range metadata; the number in braces, e.g., {3}, is the adjustment value, and the address to the right of the adjustment value indicates the unused/non-canonical bits in which the valid range metadata and adjustment value are stored. In block 920, the computer system determines the adjustment (or "offset") to be applied to the valid range and stores the adjustment value in the unused/non-canonical bits of the indirect address. In some embodiments, the adjustment is used to force the encoded range to the end of a 2's power boundary (e.g., to set a specific upper bound on the buffer size). In this way, an encoded version of the original (not encoded) valid address range may be created. The encoded version may be designed such that the least number of upper bits will change over the valid range (e.g., so that encryption of the upper bits will detect/amplify modifications to the encoded address on decryption). The encoding is reversible, such that the original intended valid address range is returned as long as it is modified within the range. In the example above, the range 0-3 decimal (0000b-0011b binary) may be encoded as [2] {0} 00xxb (where "xx" means those bits may take any value for the range: 00, 01, 10, 11). In another example, the range 1-4 decimal (0001b-0100b) may be encoded as [2] {-1} 00xxb (where the adjustment is subtracted in order to keep the upper bits constant). Alternatively, the same range 1-4 decimal (0001b-0100b), may be encoded as [2] {3} 01xxb (this time adding an adjustment of 3 in order to keep the upper bits constant). With either representation, the encoded version decodes back to the original address range 1-4. In still another example, if the buffer size is 4 KB, a 10-bit adjustment value with a resolution of 4 bytes may be used.

Other embodiments may use a signed adjustment value (e.g., 2's complement) where the buffer may be either adjusted to the beginning or end of the 2's power boundary depending on the sign (+/−) of the adjustment. Such embodiments may provide protection from either buffer overflow or underflow situations depending on the adjustment sign. In cases where 16 bits are available in unused/non-canonical addresses (e.g., in current 64-bit processors), 10 of the available bits may be used for the adjustment and the remaining 6 bits may be used for the valid range metadata (e.g., exponent value/2's power). If the exponent value reaches a range beyond a 4 KB page, the adjustment may expand by a 2's multiplier to allow adjustments of large buffers within even larger power of 2 ranges (noting that in some embodiments, 4096 bytes are fully covered with a 10-bit adjustment value allowing the adjustment to "adjust" a buffer to end with the very last 4 byte word in a 4 KB page before the upper (2's power) bits will change). Such an adjustment (e.g., incremented by 1) will adjust the buffer location 4 bytes at a time. Any other choice of initial adjustment size and word size is possible in other embodiments. In another example, if the exponent has a value of 13, then the adjustment value may be multiplied by 2 so that the adjustment may still encompass the full 2's power range (in this case, two 4 KB pages, if adjusting by 8 bytes at a time), and so on (e.g. an exponent value of 14 means the adjustment value is multiplied by 4, and an exponent value of 15 means the adjustment value is multiplied by 8 and so on, allowing the adjustment to encompass the full 2 powers range).

In block 922, the computer system encrypts a portion of the address, where the portion of the address to be encrypted is determined by the valid range metadata (e.g., exponent/2's power) and the adjustment value. The valid range metadata determines the number of the most significant address bits of the encoded address that are to be encrypted (e.g., down to a minimum number so some address bits may always be encrypted). In some embodiments, the adjustment value and/or an identification tag is encrypted as well (e.g., to create a reasonable block size for a block cipher). In some embodiments, the most significant bits of the used bits/canonical address identified in the valid range metadata are encrypted with a secret key (e.g., the secret key 720), using the valid range metadata (which may or may not include the adjustment value) as a tweak. In the illustrated embodiments, the valid range metadata (e.g., exponent/2's power) would not be encrypted because the processor uses the valid range metadata plaintext to determine the number of bits to decrypt. However, the valid range metadata (e.g., exponent/two's power) may be used as a tweak in the case of a tweakable block cipher (and thereby affect the encrypted bits). Other data values that may be used as tweaks include: data stored in the unused bits of the indirect address, the upper limit on the buffer size, an exponent of a two's power boundary selected as the upper limit on the buffer size, an adjustment value applied to the two's power boundary, a code block identifier, instruction pointer data, permission information encoded in the metadata, and/or version number (useful when reassigning/revoking pointers that were previously assigned to a program, version may be maintained by the processor in a register). Embodiments may use small block ciphers (e.g. encrypting 32 bits of data), such as Simon, Speck ciphers, and PRINCE cipher, as the block sizes corresponded to (fit within) the size of a 64-bit virtual/linear memory address/pointer. In addition or alternatively to encryption, ciphers may be used to generate a message authentication code (MAC) which may be truncated and stored in the unused non-canonical linear/virtual address bits; this cryptographic MAC may be used to detect tampering or modification of the virtual address when manipulated outside of its bounds.

As used herein, a "tweak" may refer to, among other things, a second input to a block cipher, in addition to the usual plaintext or ciphertext input and the key (e.g., the secret key 720). Encrypting the upper two canonical bits enables the computer system to detect when the address has been illegally changed, because the encryption algorithm will cause the illegally-changed upper bits to produce a random sequence of bits that are non-deterministic to an adversary, which likely results in a fault when the illegally-changed indirect address is used.

The portion of the address to be encrypted (e.g., the upper used/canonical bits) is encrypted using a cipher mode encryption algorithm, such as a tweakable block cipher, using the valid range metadata and adjustment (e.g., [2] {-1}, in the above example) as a tweak. Some examples of tweakable block ciphers include: XOR-encrypt-XOR (XEX), Liskov, Rivest, and Wagner (LRW), and XEX-based tweaked-codebook mode with ciphertext stealing (XTS). Other bit diffusion methods in which any single bit change in the cipher text results in changes across the entire decrypted plaintext can be used. If desired, alternative embodiments may trade off security for performance by using non-cryptographic methods that still achieve reasonable bit diffusion analogous to a block cipher.

The cipher selected for the encryption may be implemented in hardware, using an algorithm that has a bit-selectable block size (e.g. SPECK), or an algorithm that allows a fixed block size with a tweak using the remaining unencrypted bits (e.g., the extra bits outside the fixed block size). In some embodiments, the cipher has sufficient bit diffusion so that any bit change made to the encrypted address bits will equally affect (cascade through) all bit positions when decrypted. This provides the basis for a corrupted address given any change or bounds violation. Using this method, if the adversary attempts to tamper with the metadata (e.g., the exponent or adjustment values or identification tag, or the encrypted most significant bits) the resulting decoded address will be corrupted. In the 64-bit address space, address corruption will result in a fault with high probability, thus allowing the address corruption (and pointer access or bounds violation) to be caught by the privileged system component 742 (e.g., an operating system/executive/VMM/alternative mode/debug trace/management processor/subsystem, etc.).

In the example above, if the address/pointer value is incremented beyond 3, modifying the address/pointer in this way will corrupt the upper canonical bits and cause a non-deterministic memory access that cannot be controlled by an adversary. For instance, going beyond a buffer size by one byte will result in a random memory access that will page fault with high probability. This is due to the bit diffusion properties of the cipher to ensure that even one-bit changes will diffuse through all of the most significant bits. As a result of the adjustment, which forces values to the end of the 2's power range, buffer overflows cause corruption of the encrypted address bits.

The cipher tweak may be extended to include a code block identifier to provide access controls over which code blocks (e.g., blocks of the calling code) are permitted to use an indirect address/pointer to access memory. Additionally, instruction pointer (which may be referred to as the "program counter") information or ranges may be encoded as part of the pointer encryption tweak. The instruction pointer information may be used to limit the scope of what code can access what data. For example, all code may be arranged within fixed blocks of memory within the 64-bit address space. Code with similar access permissions may be grouped together in the same block or range. The tweak may include the identifier for the block of memory from which an instruction is executing. In this way, code and data may be associated, and access controlled, such that an adversary coming from a different code block will not be able to access data of the protected block using the encrypted pointers, because the encrypted pointers will not decode properly if the wrong code block identifier is used as a tweak. Further, when a block of code calls, e.g., malloc, to allocate memory to itself, malloc may return the encrypted address using the calling code's memory block to ensure private access to the allocated memory (so long as the allocated memory isn't freed and then reallocated to another code block). Alternatively, other methods of identifying the calling code may be used in the tweak, such as protection keys. Still further, the metadata for read/write/execute access that is used by the processor 112 to control access to memory may be used as part of the tweak for the encrypted address bits. Additionally, the instruction pointer may itself be represented as an encoded pointer (e.g., range-based). In this case, the metadata and encrypted address bits may be used as part of the "tweak" identifying the code block accessing a data pointer or requesting a memory allocation/assignment.

Figure 10:
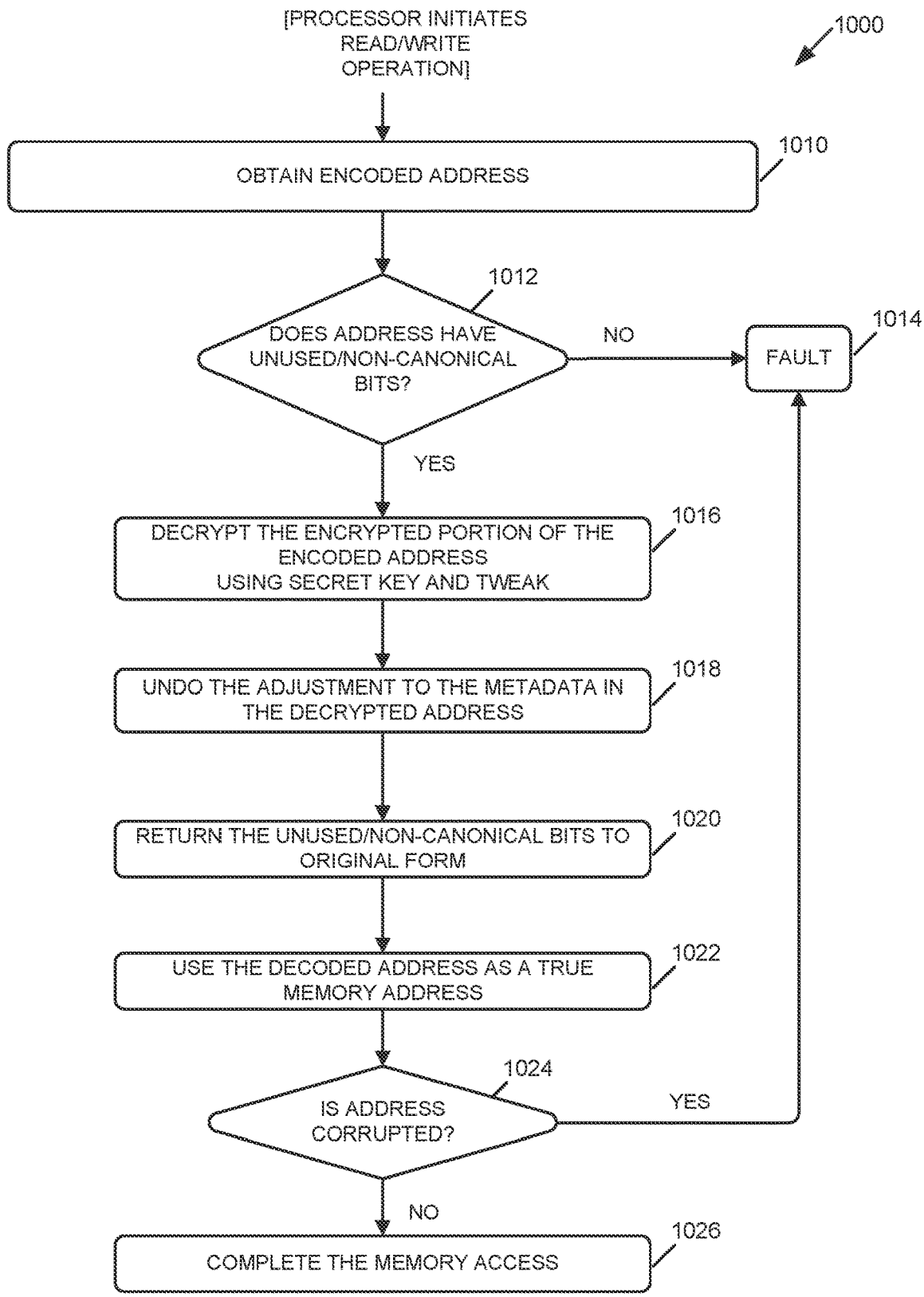
FIG. 10 is a flow diagram of at least one embodiment of a method for verifying a previously secured indirect address.

Referring now to FIG. 10, an example of a method 1000 for decoding an address is shown. Portions of the method 1000 may be executed by hardware, firmware, and/or software of a computer system (e.g., by the processor 112 invoking the secure move circuitry 660 and/or the address decoding circuitry 662). The method 1000 begins in response to a memory access operation such as a read, write, or execute operation, e.g., a MOV instruction. Table 2 below provides some illustrative examples of MOV instructions that can use the address encoding technology disclosed herein. Of course, different processor architectures may refer to the "MOV" functionality by different names for the instructions or different options/parameters. As such, the disclosed embodiments apply to all types of "MOV" functionality across different architectures, irrespective of the terminology used to refer to such functionality. Further, the MOV instruction is one example, and any instruction that can access memory to read/write data may apply the address encoding and decoding methods disclosed herein.

TABLE 2

Example MOV instructions.

| Instruction | Explanation |
| --- | --- |
| MOV eax, [ebx] | Move the 4 bytes in memory at the encoded address contained in EBX into EAX |
| MOV [var], ebx | Move the contents of EBX into the 4 bytes at encoded memory address var. (var is a constant). |
| MOV eax, [esi − 4] | Move 4 bytes at encoded memory address ESI + (−4) into EAX (note, this will corrupt address if goes out of bounds) |
| MOV [esi + eax], cl | Move the contents of CL into the byte at encoded address ESI + EAX (one is base address, one offset. Pointers can be computed as long as stay in bounds) |
| MOV edx, [esi + 4*ebx] | Move the 4 bytes of data at encoded address ESI + 4*EBX into EDX (EBX is an offset, address will become corrupted if EBX goes out of bounds) |
| MOV BYTE PTR [ebx], 2 | Move 2 into the single byte at the encoded address stored in EBX. |

TABLE 2-continued

Example MOV instructions.

| Instruction | Explanation |
| --- | --- |
| MOV WORD PTR [ebx], 2 | Move the 16-bit integer representation of 2 into the 2 bytes starting at the encoded address in EBX. |
| MOV DWORD PTR [ebx], 2 | Move the 32-bit integer representation of 2 into the 4 bytes starting at the encoded address in EBX. |
| MOV QWORD PTR [rbp + 4F0h], rax | Move 64-bit integer at RBP + offset |
| MOV rax, [rbx] | Moves 8 bytes beginning at rbx into rax |
| MOV rax, [addr] | Instruction moves 8 bytes beginning at addr + rip to rax (this is 32-bit instruction pointer relative addressing, here addr needs to be properly encoded or instruction pointer needs to be encoded) |

In block 1010, the computer system obtains the encoded address (e.g., the encoded address 706, which may be obtained from a register). In block 1012, the computer system determines whether the encoded address obtained in block 1010 has unused or non-canonical bits. If the computer system determines that the encoded address does not have unused/non-canonical bits (e.g., the address does not fall within the non-canonical, or otherwise reserved, range of addresses, whether the address range is 32-bit, 64-bit, 128-bit or whatever range an alternate architecture may require), a fault is raised (1014). If the computer system determines that the encoded address has unused/non-canonical bits (e.g., the address falls with the canonical or reserved address range), the computer system proceeds to block 1016. In block 1016, the computer system decrypts the encrypted portion of the encoded address, using the decryption algorithm counterpart of the encryption algorithm used in block 922 of FIG. 9, and using the same secret key and tweak as used by the encryption algorithm in block 922 of FIG. 9. In block 1018, the computer system "undoes" the adjustment to the range metadata in the decrypted address (e.g., by subtracting the decrypted adjustment value in the unused/non-canonical bits from the full decrypted value of the address). In block 1030, the computer system returns the decrypted address to its original (e.g., canonical) form by, for example, removing the unused/non-canonical bits. In block 1022, the computer system uses the decoded address output by block 1020 as a "true" (e.g., virtual or linear) memory address (e.g., as a pointer). In block 1024, the computer system determines whether the decoded address used as a memory address/pointer at block 1022 is a corrupted address. If the decoded address is corrupted, a fault is raised (1014). If the decoded address is not corrupted, the computer system completes the memory access operation successfully, using the decoded address as a memory address/pointer, in block 1026. In this way, the method 1000 allows the computer system to verify the range-encoded indirect address and enforce the embedded range check before converting the range-encoded address into a real memory address. Additionally, invalid adjustment values (e.g., adjustment values that go beyond the 2's power range), may be used to determine with some probability when a corruption occurs as well as invalid address values or metadata reserved to detect when corruption occurs. Even if corruption is not detected, the resulting address would not be deterministic (and therefore usable) to an adversary.

Tag and Address Encoding/Encrypting

Figure 11:
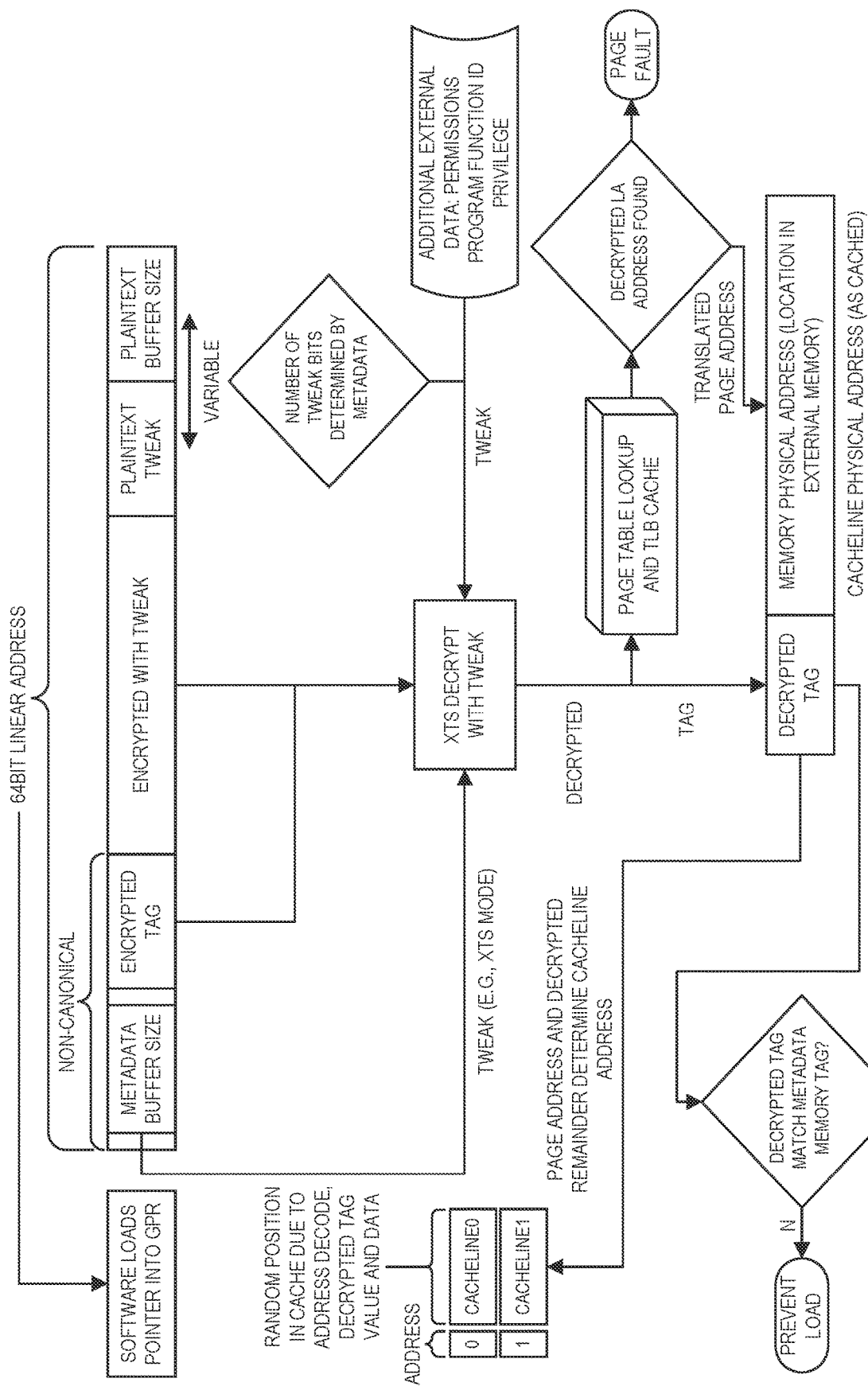
FIG. 11 represents an embodiment in which memory tags are encrypted with the encrypted part of the address.

FIG. 11 represents an embodiment in which memory tags are encrypted with the encrypted part of the address. Embodiments in which memory tags are included in the encrypted part of the address as assigned by the memory allocator (e.g. malloc) may prevent adversaries from manipulating the ciphertext portion of the address without also affecting the tag bits. Therefore, an adversary cannot take a fixed address and start guessing the tag bits independently. The encryption will cause the tag value and the encrypted address bits to change, resulting in a random tag associated with a random address.

Embodiments in which the memory tag is included in the encrypted portion of the cryptographic pointer may prevent an adversary from guessing tags. If any part of the encrypted pointer is modified, all the decrypted bits will be random. Both the decrypted address and tag will be different; therefore, an adversary cannot correlate a tag with an encrypted address because both change each time the adversary attempts to modify the ciphertext and speculate on the result Example Embodiments In an embodiment, a processor includes a decoder, a cache, address translation circuitry, a cache controller, and a memory controller. The decoder is to decode an instruction. The instruction is to specify a first address associated with a data object, the first address having a first memory tag. The address translation circuitry is to translate the first address to a second address, the second address to identify a memory location of the data object. The comparator is to compare the first memory tag and a second memory tag associated with the second address. The cache controller is to detect a cache miss associated with the memory location. The memory controller is to, in response to the comparator detecting a match between the first memory tag and the second memory tag and the cache controller detecting the cache miss, load the data object from the memory location into the cache.

In various embodiments, any or any combination of the following may also apply. The first address may be a virtual address and the second address may be a physical address. The memory controller may also be to prevent loading a cache line corresponding to the memory location until the comparator has detected the match. The memory controller may also be to, in response to the comparator detecting a mismatch between the first memory tag and the second memory tag, load data not indicative of the data object into a cache line corresponding to the memory location. The processor may also include poison queue circuitry to, in response to the comparator detecting a mismatch between the first memory tag and the second memory tag, set an indicator to indicate that a cache line corresponding to the memory location is invalid. The poison queue circuitry may also be to provide an indication to software that the cache line is invalid only after a result of the instruction has been committed. The processor may also include pointer security circuitry to define the first memory tag. The processor may also include encryption circuitry to cryptographically secure the data object at least partially based on the first memory tag. The first memory tag may include an identification tag to identify a type, a function, a memory location, or a use for the data object. The encryption circuitry may be to use a least a portion of the memory tag to at least partially define a tweak input to an encryption algorithm. The first memory tag may include an encryption tag, and the encryption circuitry may also be to use the encryption tag to identify one of a plurality of encryption keys. The first memory tag may include a small object tag to indicate whether a cache line associated with the memory location is to include a plurality of data objects. The small object tag may be to enable sub-cacheline granularity of memory tagging. The first memory tag includes a bound distance tag to indicate an allowed distance between the first memory address and the data object. The processor may also include integrity check circuitry to generate an integrity check value at least partially based on the first address and an encrypted value of the data object. The processor may also include pointer security circuitry to detect tampering with the first address at least partially based on the integrity check values.

In an embodiment, a processor includes a decoder to decode an instruction to allocate a memory region to a software program and an execution unit to execute the instruction. The execution unit includes range rule circuitry to determine a valid range for the memory region; address adjustment circuitry to determine a first number of address bits to be used by the software program to manipulate an address within the valid range and a second number of address bits to include a memory tag to indicate access permission; and encryption circuitry to encrypt at least a portion of the address and the memory tag to generate an encrypted address to be returned to the software program.

In an embodiment, a processor includes a decoder to decode an instruction, the instruction to specify an encrypted first address associated with a data object; decryption circuitry to decrypt the encrypted first address to generate a decrypted first address and a decrypted first memory tag; a cache; address translation circuitry to translate the decrypted first address to a second address, the second address to identify a memory location of the data object; a comparator to compare the first memory tag and a second memory tag associated with the second address; a cache controller to detect a cache miss associated with the memory location; and a memory controller to, in response to the comparator detecting a match between the first memory tag and the second memory tag and the cache controller detecting the cache miss, load the data object from the memory location into the cache.

In an embodiment, a processor includes a decoder to decode an instruction, the instruction to specify a first address associated with a data object, the first address having a first memory tag; a cache; address translation circuitry to translate the first address to a second address, the second address to identify a memory location of the data object; a comparator to compare the first memory tag and a second memory tag associated with the second address; a cache controller to detect a cache miss associated with the memory location; and means for, in response to the comparator detecting a match between the first memory tag and the second memory tag and the cache controller detecting the cache miss, loading the data object from the memory location into the cache.

In various embodiments, any or any combination of the following may also apply. The means may also be for preventing loading a cache line corresponding to the memory location until the comparator has detected the match. The means may also be for, in response to the comparator detecting a mismatch between the first memory tag and the second memory tag, loading data not indicative of the data object into a cache line corresponding to the memory location. The processor may also include poison queue means for, in response to the comparator detecting a mismatch between the first memory tag and the second memory tag, setting an indicator to indicate that a cache line corresponding to the memory location is invalid. The poison queue means may also be for providing an indication to software that the cache line is invalid only after a result of the instruction has been committed.

In an embodiment, a processor includes a decoder to decode an instruction to allocate a memory region to a software program; an execution unit to execute the instruction, the execution unit including range rule means for determining a valid range for the memory region; address adjustment means for determining a first number of address bits to be used by the software program to manipulate an address within the valid range and a second number of address bits to include a memory tag to indicate access permission; and encryption means for encrypting at least a portion of the address and the memory tag to generate an encrypted address to be returned to the software program.

In an embodiment, a processor includes a decoder to decode an instruction, the instruction to specify an encrypted first address associated with a data object; decryption circuitry for decrypting the encrypted first address to generate a decrypted first address and a decrypted first memory tag; a cache; address translation circuitry to translate the decrypted first address to a second address, the second address to identify a memory location of the data object; a comparator to compare the first memory tag and a second memory tag associated with the second address; a cache controller to detect a cache miss associated with the memory location; and means for, in response to the comparator detecting a match between the first memory tag and the second memory tag and the cache controller detecting the cache miss, loading the data object from the memory location into the cache.

In an embodiment, a method includes decoding an instruction, the instruction to specify a first address associated with a data object, the first address having a first memory tag; translating the first address to a second address, the second address to identify a memory location of the data object; comparing the first memory tag and a second memory tag associated with the second address; detecting a cache miss associated with the memory location; and loading, in response to detecting a match between the first memory tag and the second memory tag and detecting the cache miss, the data object from the memory location into a cache.

In various embodiments, any or any combination of the following may also apply. The first address may be a virtual address and the second address may be a physical address. The method may also include preventing loading a cache line corresponding to the memory location until the match is detected. The method may also include loading, in response to detecting a mismatch between the first memory tag and the second memory tag, data not indicative of the data object into a cache line corresponding to the memory location. The method may also include setting, in response to the comparator detecting a mismatch between the first memory tag and the second memory tag, an indicator to indicate that a cache line corresponding to the memory location is invalid. The method may also include providing an indication to software that the cache line is invalid only after a result of the instruction has been committed.

In an embodiment, a method includes decoding an instruction to allocate a memory region to a software program; executing the instruction, execution including determining a valid range for the memory region; determining a first number of address bits to be used by the software program to manipulate an address within the valid range; determining a second number of address bits to include a memory tag to indicate access permission; and encrypting at least a portion of the address and the memory tag to generate an encrypted address; and returning the encrypted address to the software program.

In an embodiment, a method includes decoding an instruction, the instruction to specify an encrypted first address associated with a data object; decrypting the encrypted first address to generate a decrypted first address and a decrypted first memory tag; translating the decrypted first address to a second address, the second address to identify a memory location of the data object; comparing the first memory tag and a second memory tag associated with the second address; detecting a cache miss associated with the memory location; and loading, in response to detecting a match between the first memory tag and the second memory tag and detecting the cache miss, the data object from the memory location into the cache.

In embodiments, an apparatus may include means for performing any of the functions and/or methods described above. In embodiments, a machine-readable tangible medium may store instructions, which, when executed by a machine, cause the machine to perform any of the methods described above.

Exemplary Core, Processor, and System Architectures

Embodiments of the invention have been described and depicted with reference to a processor 112, which may represent any of many different processors in which the invention is embodied in different ways and/or for different purposes. These processors and cores, for example as described below, may include hardware, such as caches and branch predictors, that improve performance but may make the processor and/or core more vulnerable to analysis that may be defended against according to embodiments of the invention.

For instance, implementations of cores (e.g., cores 118) in a processor in which the invention may be embodied may include: a general purpose in-order core intended for general-purpose computing; a high performance general purpose out-of-order core intended for general-purpose computing; a special purpose core intended primarily for graphics and/or scientific (throughput) computing. Implementations of processors in which the invention may be embodied may include: a central processing unit (CPU) including one or more general purpose in-order cores intended for general-purpose computing and/or one or more general purpose out-of-order cores intended for general-purpose computing; and a coprocessor including one or more special purpose cores intended primarily for graphics and/or scientific (throughput) computing. Such different processors lead to different computer system architectures, which may include: the coprocessor on a separate chip from the CPU; the coprocessor on a separate die in the same package as a CPU; the coprocessor on the same die as a CPU (in which case, such a coprocessor is sometimes referred to as special purpose logic, such as integrated graphics and/or scientific (throughput) logic, or as special purpose cores); and a system on a chip (SoC) that may include on the same die the described CPU (sometimes referred to as the application core(s) or application processor(s)), the above described coprocessor, and additional functionality.

Exemplary core architectures are described next, followed by descriptions of exemplary processors and computer architectures. Each processor may include one or more cores, where each core and/or combination of cores may be architected and designed to execute one or more threads, processes, or other sequences of instructions at various times. Core architectures and design techniques may provide for and/or support the concurrent execution of multiple threads, according to any of a type of approaches known as simultaneous (or symmetric) multi-threading (SMT) or any other approach.

Further, as mentioned above and explained in more detail below, embodiments of the present disclosure may apply to any type of processor or processing element, including general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device. The processor or processors may be implemented on one or more chips. The processor or processors may be a part of and/or may be implemented on one or more substrates using any of a number of process technologies, such as, for example, BiCMOS, CMOS, or NMOS. The processors and processing devices listed above and described herein are exemplary; as explained herein, the present disclosure is applicable to any processor or processing device.

Further, as mentioned above and explained in more detail below, embodiments of the present disclosure may apply to processors or processing elements using a wide variety of instruction sets and instruction set architectures, including for example, the x86 instruction set (optionally including extensions that have been added with newer versions); the MIPS instruction set of MIPS Technologies of Sunnyvale, Calif.; the ARM instruction set (with optional additional extensions such as NEON) of ARM Holdings of Sunnyvale, Calif.; IBM's "Power" instruction set, or any other instruction set, including both RISC and CISC instruction sets. The instruction sets and instruction set architectures listed above and described herein are exemplary; as explained herein, the present disclosure is applicable to any instruction set or instruction set architecture.

Exemplary Core Architecture

Figure 12:
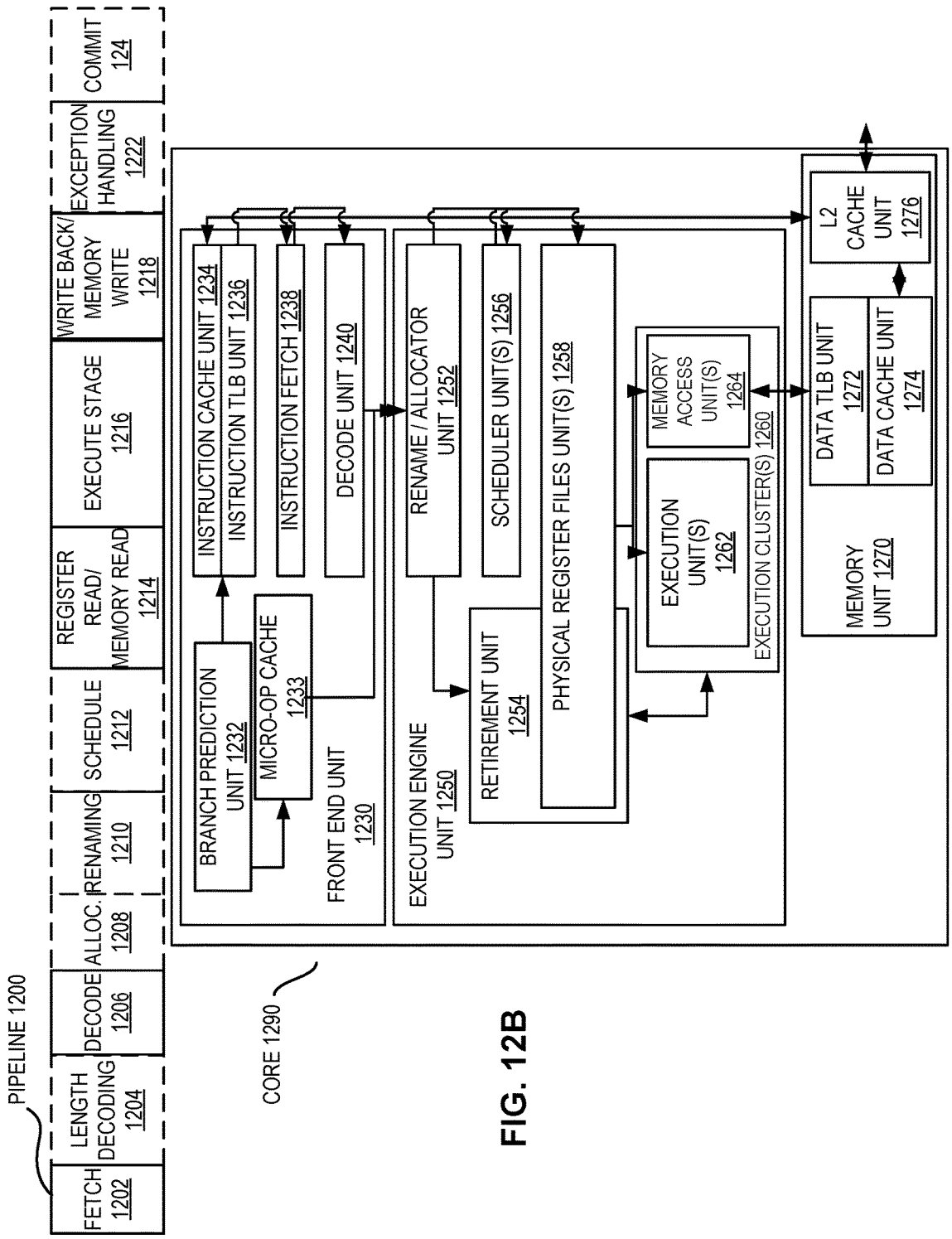
FIG. 12A is a block diagram illustrating both an exemplary in-order pipeline and an exemplary register renaming, out-of-order issue/execution pipeline according to embodiments of the invention.
FIG. 12B is a block diagram illustrating both an exemplary embodiment of an in-order architecture core and an exemplary register renaming, out-of-order issue/execution architecture core to be included in a processor according to embodiments of the invention.

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 124.

FIG. 12B shows processor core 1290 including a front-end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like. For example, as explained above, core 1290 may be any member of a set containing: general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device.

The front-end unit 1230 includes a branch prediction unit 1232 coupled to a micro-op cache 1233 and an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The micro-operations, micro-code entry points, microinstructions, etc. may be stored in at least the micro-op cache 1233. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front-end unit 1230). The micro-op cache 1233 and the decode unit 1240 are coupled to a rename/allocator unit 1252 in the execution engine unit 1250. In various embodiments, a micro-op cache such as 1233 may also or instead be referred to as an op-cache, u-op cache, uop-cache, or μop-cache; and micro-operations may be referred to as micro-ops, u-ops, uops, and μops.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif., IBM's "Power" instruction set, or any other instruction set, including both RISC and CISC instruction sets), including the instruction(s) described herein. In one embodiment, the core 1290 includes logic to support a packed data instruction set extension (e.g., AVX, AVX2, AVX-512), thereby allowing the operations used by many multimedia applications to be performed using packed data.

It should be understood that the core may support multithreading (executing two or more parallel sets of operations or threads), and may do so in a variety of ways including time sliced multithreading, SMT (e.g., a single physical core provides a logical core for each of the threads that physical core is simultaneously multithreading), or a combination thereof (e.g., time sliced fetching and decoding, and SMT thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache(s) may be external to the core and/or the processor.

Exemplary Core Architecture

Figure 13:
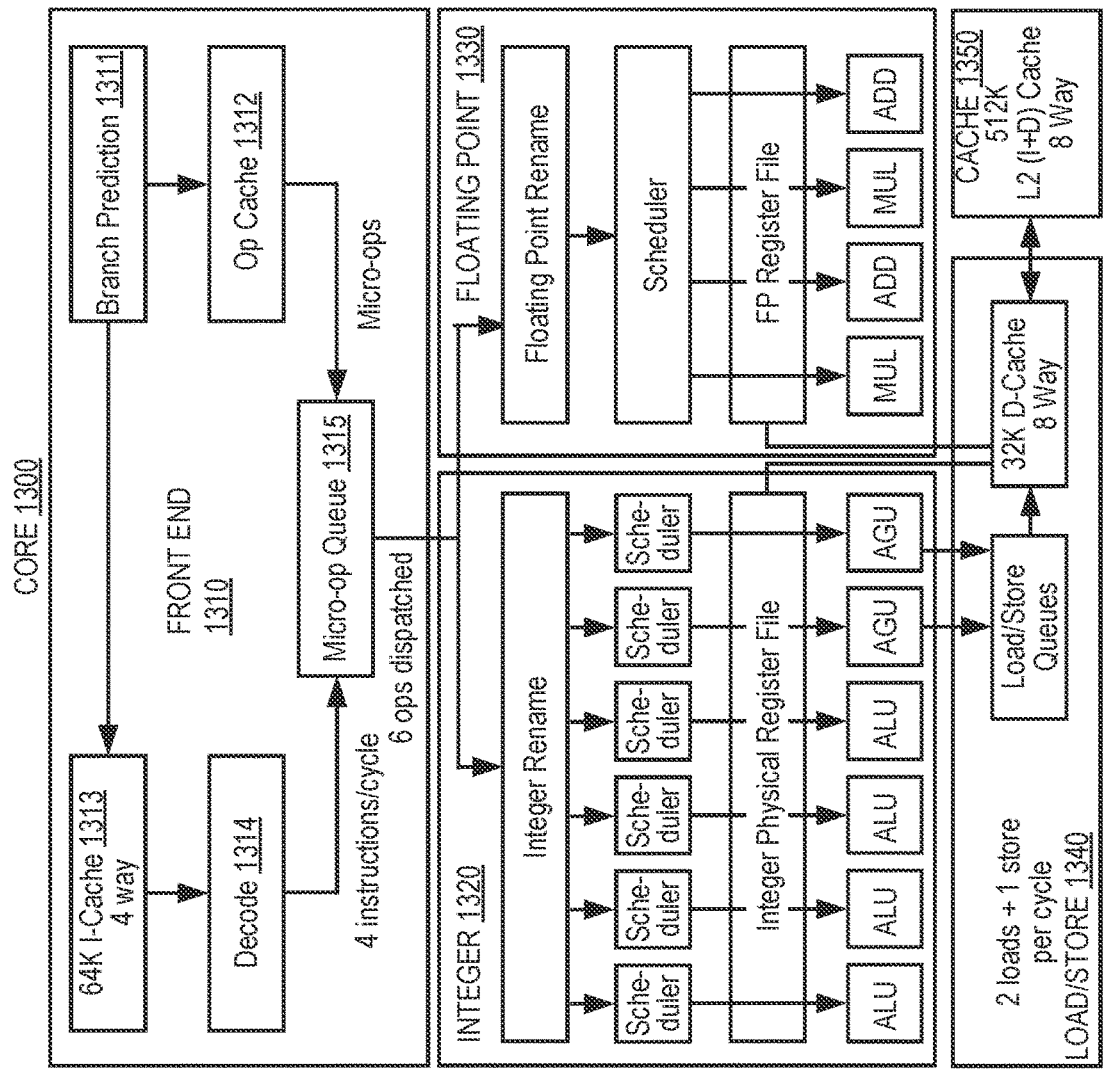
FIG. 13 is a block diagram of an illustrative out-of-order issue/execution processor core that may be included in a processor according to embodiments of the invention.

FIG. 13 is a block diagram of an illustrative out-of-order issue/execution processor core that may be included in a processor according to embodiments of the invention. In FIG. 13, processor core 1300 includes front-end unit 1310, integer unit 1320, FP unit 1330, load-store unit 1340, and level 2 (L2) cache unit 1350. FIG. 13 is provided for illustrative purposes, and as such, shows various units arranged and named according to one of many approaches that are possible according to embodiments of the present invention.

In FIG. 13, front-end unit 1310 includes branch prediction unit 1311, micro-operation-cache (op-cache) unit 1312, instruction cache (i-cache) unit 1313, decode unit 1314, and micro-operation (micro-op) queue unit 1315. Branch prediction unit 1311 includes branch prediction circuitry, such as a branch-target buffer (BTB), to reduce average branch delay and is coupled to op-cache unit 1312 and i-cache unit 1313. Op-cache unit 1312 includes an op-cache in which to cache micro-ops associated with instructions. I-cache 1313 unit includes an i-cache, which in an embodiment may be a 64K, four-way i-cache, in which to cache instructions. I-cache unit 1313 is coupled to decode unit 1314 to provide cached instructions to be decoded. Decode unit 1314 includes decoding circuitry, such as an instruction decoder, to decode instructions. In an embodiment, front-end unit 1310 may fetch and decode unit 1314 may decode up to four instructions per clock cycle. Op-cache unit 1312 and decode unit 1314 are each coupled to micro-op queue unit 1315 to provide two paths for loading micro-ops into micro-op queue unit 1315. Micro-op queue unit 1315 includes a micro-op queue, which in an embodiment may dispatch six micro-ops per cycle to one or more execution units.

Also, in FIG. 13, integer unit 1320 includes integer rename unit 1321; integer scheduler units 1322A, 1322B, 1322C, 1322D, 1322E, and 1322F (collectively, integer scheduler units 1322); integer physical register file 1323; arithmetic-logic units (ALUs) 1324A, 1324B, 1324C, and 1324D (collectively, ALUs 1324); and address generation units (AGUs) 1325A and 1325B (collectively, AGUs 1325). Integer rename unit 1321 is coupled to micro-op queue unit 1315 to receive one or more micro-ops to be executed, in whole or in part, by one or more of ALUs 1324 and/or AGUs 1325. Integer rename unit 1321 includes register renaming circuitry and is also coupled to integer scheduler units 1322, which in turn are coupled to integer physical register file 1323, to provide for integer-register renaming. Integer scheduler units 1322 include scheduling circuitry for scheduling micro-ops to be executed, in whole or in part, by one or more of ALUs 1324 and/or AGUs 1325. Integer physical register file 1323 includes a file of physical integer registers, which in an embodiment may include 168 physical integer registers. Each of ALUs 1324 and AGUs 1325 are coupled to physical register file 1323 to receive values to be used as inputs in the execution of micro-ops and/or to provide values as outputs of the execution of micro-ops.

Also, in FIG. 13, FP unit 1330 includes FP rename unit 1331, FP scheduler unit 1332, FP register file 1333, FP multipliers 1334A and 1334B (collectively, FP multipliers 1334), and FP adders 1335A and 1335B (collectively, FP adders 1335). FP rename unit 1331 is coupled to micro-op queue unit 1315 to receive one or more micro-ops to be executed, in whole or in part, by one or more of FP multipliers 1334 and/or FP adders 1335. FP rename unit 1331 includes register renaming circuitry and is also coupled to FP scheduler unit 1332, which in turn are coupled to FP register file 1333, to provide for FP-register renaming. FP scheduler unit 1332 includes scheduling circuitry for scheduling micro-ops to be executed, in whole or in part, by one or more of FP multipliers 1334 and/or FP adders 1335. Each of FP multipliers 1334 and FP adders 1335 are coupled to FP register file 1333 to receive values to be used as inputs in the execution of micro-ops and/or to provide values as outputs of the execution of micro-ops.

Also, in FIG. 13, load-store unit 1340 includes load-store queue unit 1341 and data cache (d-cache) unit 1342. Load-store queue unit 1341 may include any number of load and/or store queues, in an embodiment providing for two loads and one store per clock cycle, coupled to AGUs 1325 to receive memory addresses for load and/or store operations. D-cache unit 1342 includes a d-cache, which in an embodiment may be a 32K, eight-way level 1 (L1) d-cache, in which to cache data, coupled to integer physical register file 1323, FP register file 1333, and load-store queue unit 1341 to receive and provide data generated by and to be used in the execution of micro-ops.

Also, in FIG. 13, L2 cache unit 1350 includes an L2 cache, which in an embodiment may be a 512K, eight-way cache, in which to cache instructions and data.

Exemplary Processor Architectures

Figure 14:
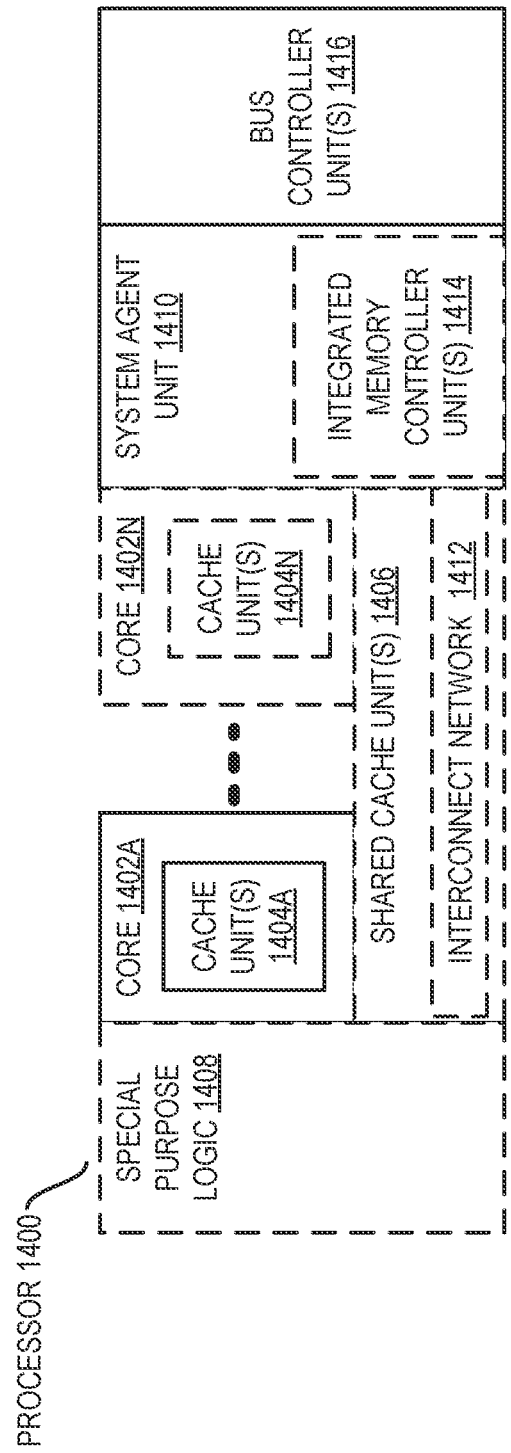
FIG. 14 is a block diagram of a processor that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); 3) a coprocessor with the cores 1402A-N being a large number of general purpose in-order cores; and 4) the cores 1402A-N representing any number of disaggregated cores with a separate input/output (I/O) block. Thus, the processor 1400 may be a general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring-based interconnect unit 1412 interconnects the integrated graphics logic 1408 (integrated graphics logic 1408 is an example of and is also referred to herein as special purpose logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Figure 15:
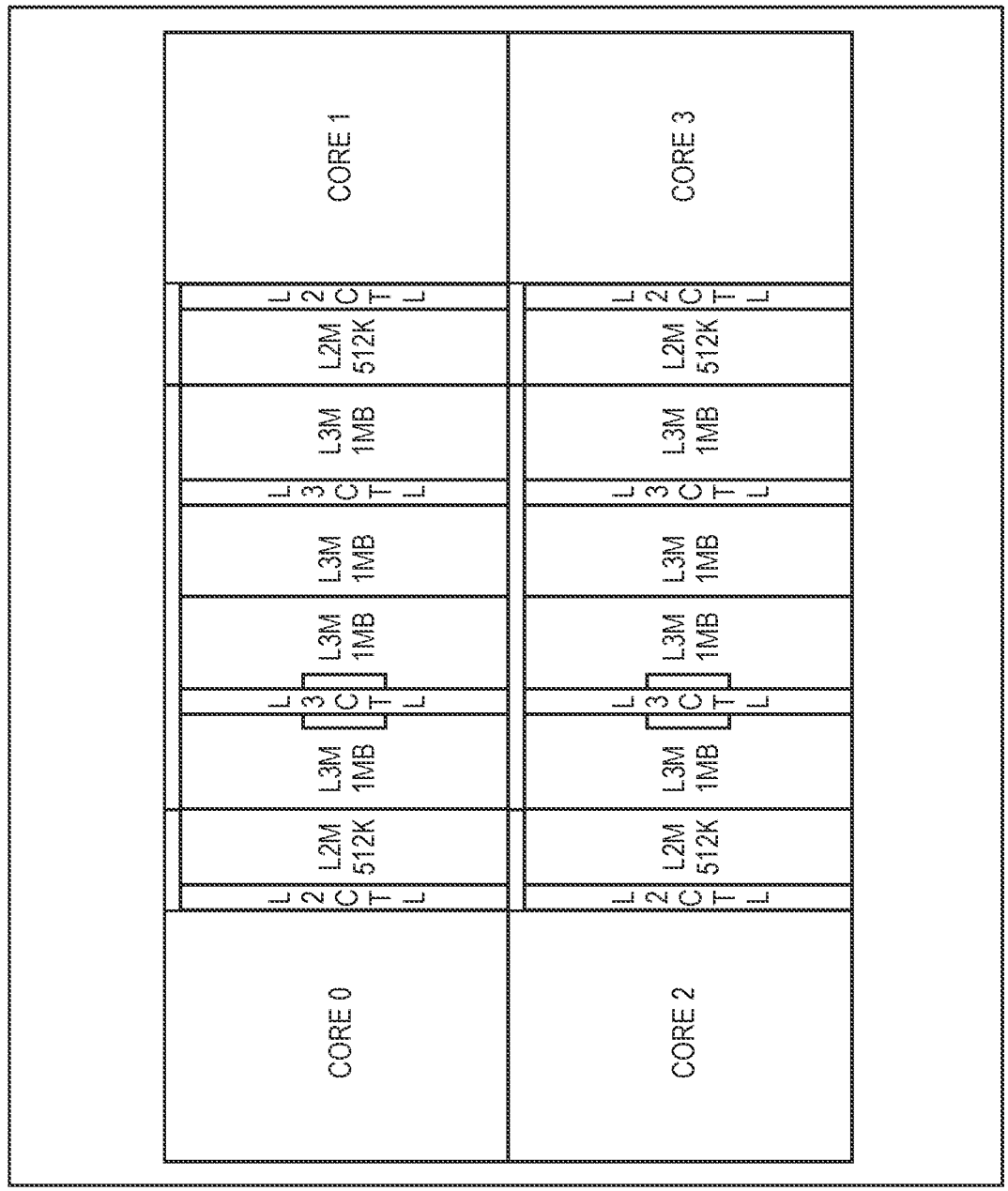
FIG. 15 is a block diagram of an illustrative central processing unit (CPU) complex that may be included in a processor according to embodiments of the invention.

FIG. 15 is a block diagram of an illustrative central processing unit (CPU) complex that may be included in a processor according to embodiments of the invention. In an embodiment, the L3 cache is an 8 MB 16-way cache split over a four-core module (referred to as a CPU complex or CCX), affording a 2 MB "slice" of L3 cache per core. However, the L3 cache slices in a CCX are implemented such that the L3 cache is a shared cache. Multiple CCXs may be included in a single processor (e.g., two CCXs form a 16 MB L3 cache). The 8 MB caches on each CCX are separate, so they act as a last level cache per four-core module with the appropriate hooks into the other L3 cache to determine if data is needed (the protocols involved in the L3 cache design allow each core to access the L3 cache of each other core). Thus, these L1, L2, and L3 caches are coherent caches, with the L3 cache slices within a CCX and between CCXs being connected by a cache coherent interconnect (also referred to as a cache coherent fabric).

Figure 16:
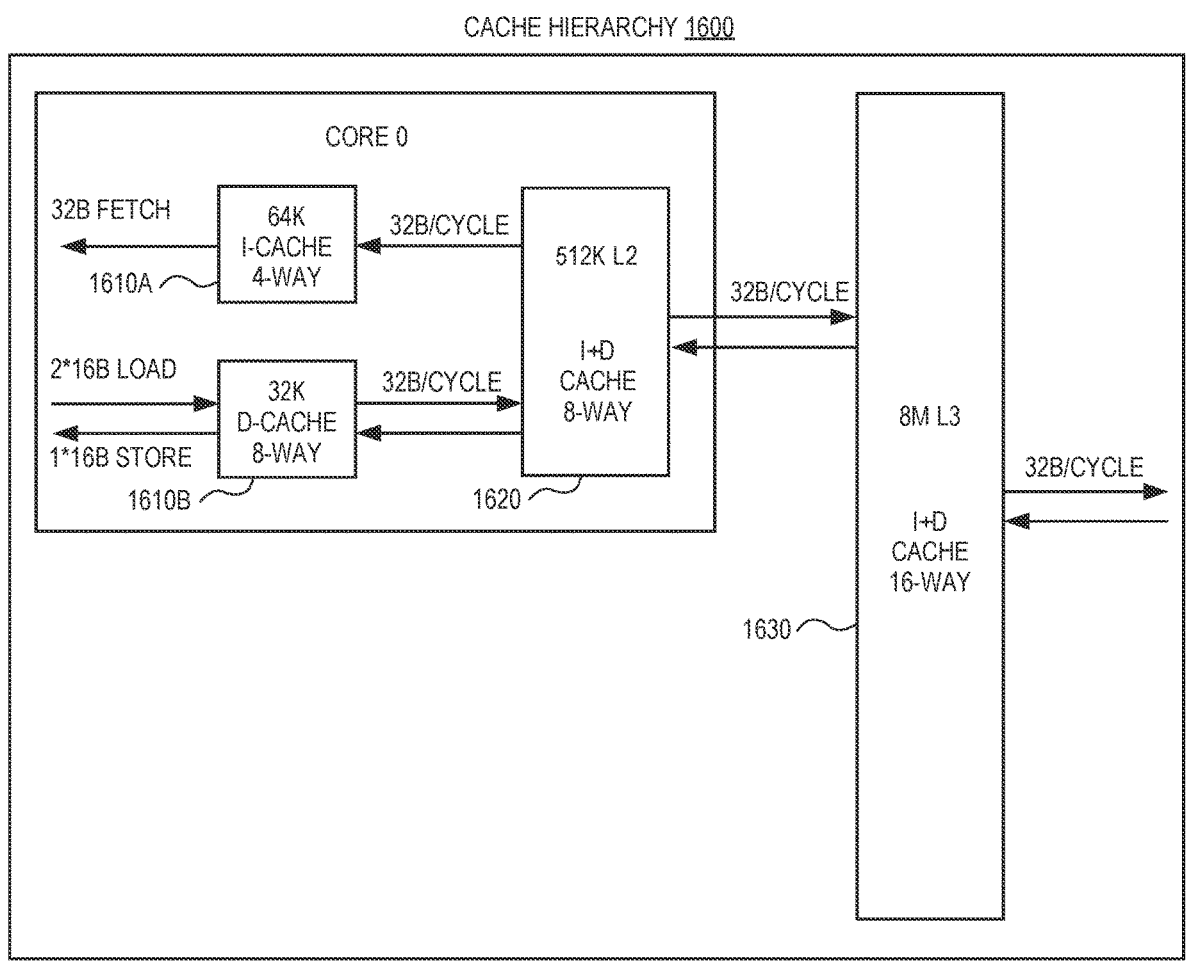
FIG. 16 is a block diagram of an illustrative cache hierarchy that may be included in a processor according to embodiments of the invention.

FIG. 16 is a block diagram of an illustrative cache hierarchy that may be included in a processor according to embodiments of the invention. In FIG. 16, cache hierarchy 1600 includes L1 i-cache 1610A and L1 d-cache 1610B (collectively, L1 cache 1610), L2 instruction and date cache 1620, and level 3 (L3) instruction and data cache 1630. In an embodiment, both L1 cache 1610 and L2 cache 1620 are private/local writeback caches, while L3 cache 1630 is a victim cache. In an embodiment, L1 i-cache 1610A is a 64 KB 4-way cache, L1 d-cache 1610B is a 32 KB 8-way cache, L2 cache 1620 is a 512 KB 8-way cache, and level 3 (L3) cache 1630 is an 8 MB 16-way cache.

Exemplary Computer Architectures

FIGS. 17-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), general-purpose processors, server processors or processing elements for use in a server-environment, coprocessors (e.g., security coprocessors) high-throughput MIC processors, GPGPU's, accelerators (such as, e.g., graphics accelerators, cryptographic accelerators, fixed function accelerators, machine learning accelerators, networking accelerators, or computer vision accelerators), field programmable gate arrays, or any other processor or processing device, graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
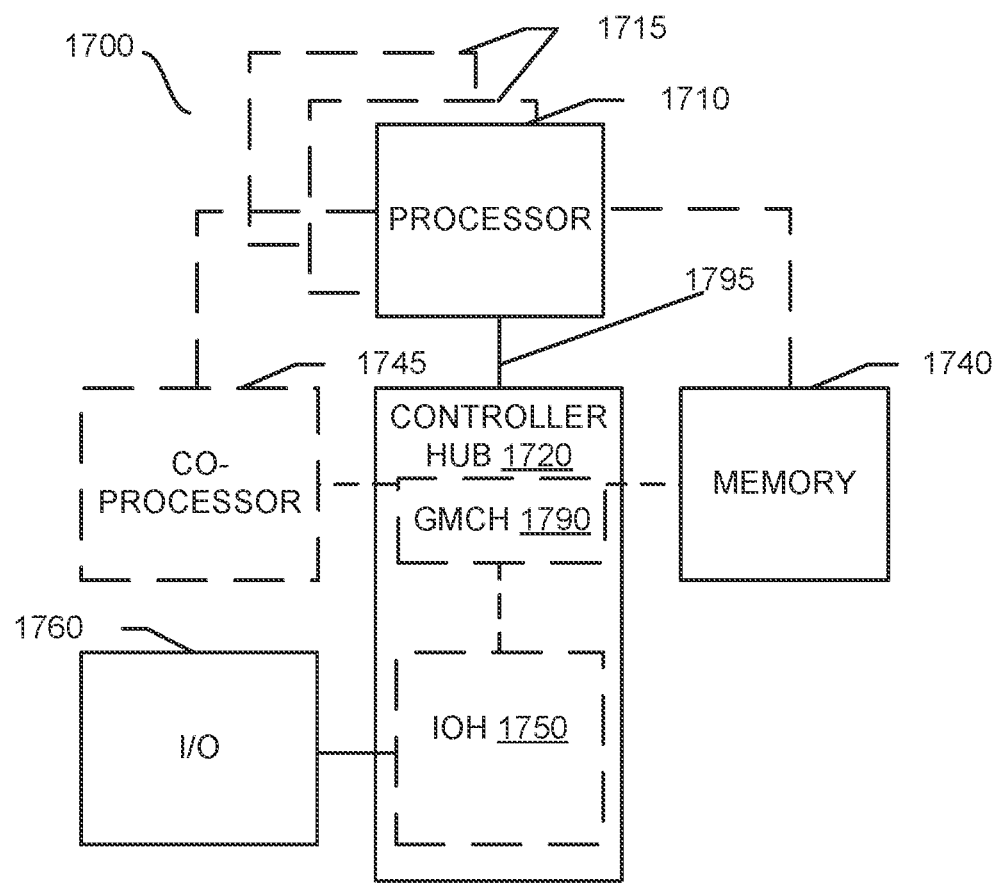
FIGS. 17-21 are block diagrams of exemplary computer architectures.

Referring now to FIG. 17, shown is a block diagram of a system 1700 in accordance with one embodiment of the present invention. The system 1700 may include one or more processors 1710, 1715, which are coupled to a controller hub 1720. In one embodiment, the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 couples I/O devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1400.

The memory 1740 may be, for example, dynamic random-access memory (DRAM), phase change memory (PCM), or a combination of the two. For at least one embodiment, the controller hub 1720 communicates with the processor(s) 1710, 1715 via a multi-drop bus, such as a front-side bus (FSB), point-to-point interface such as QuickPath Interconnect (QPI), or similar connection 1795.

In one embodiment, the coprocessor 1745 is a special-purpose processor (including, e.g., general-purpose processors, server processors or processing elements for use in a server-environment, coprocessors such as security coprocessors, high-throughput MIC processors, GPGPU's, accelerators, such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device). In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
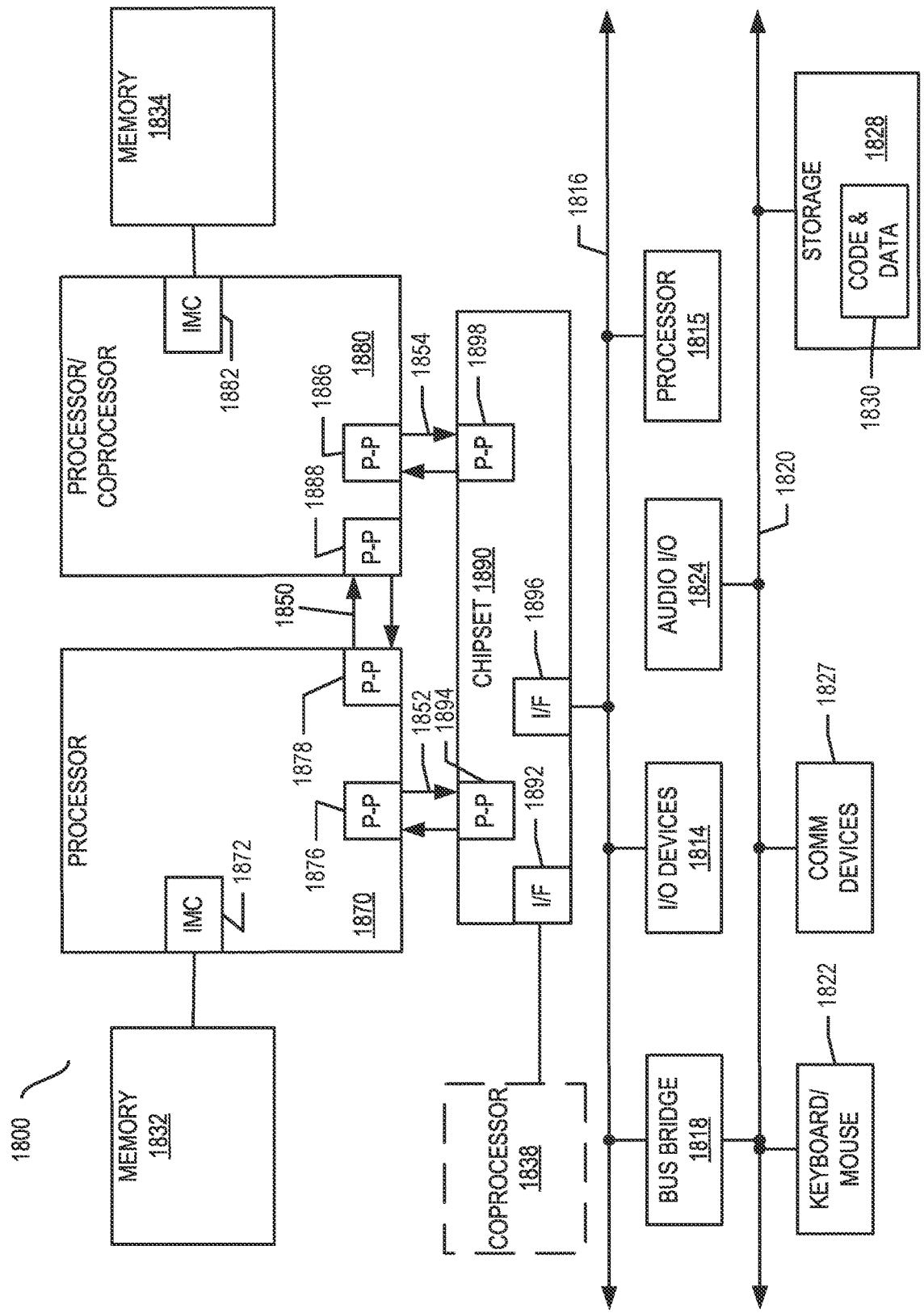

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1400. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller unit's point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1892. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
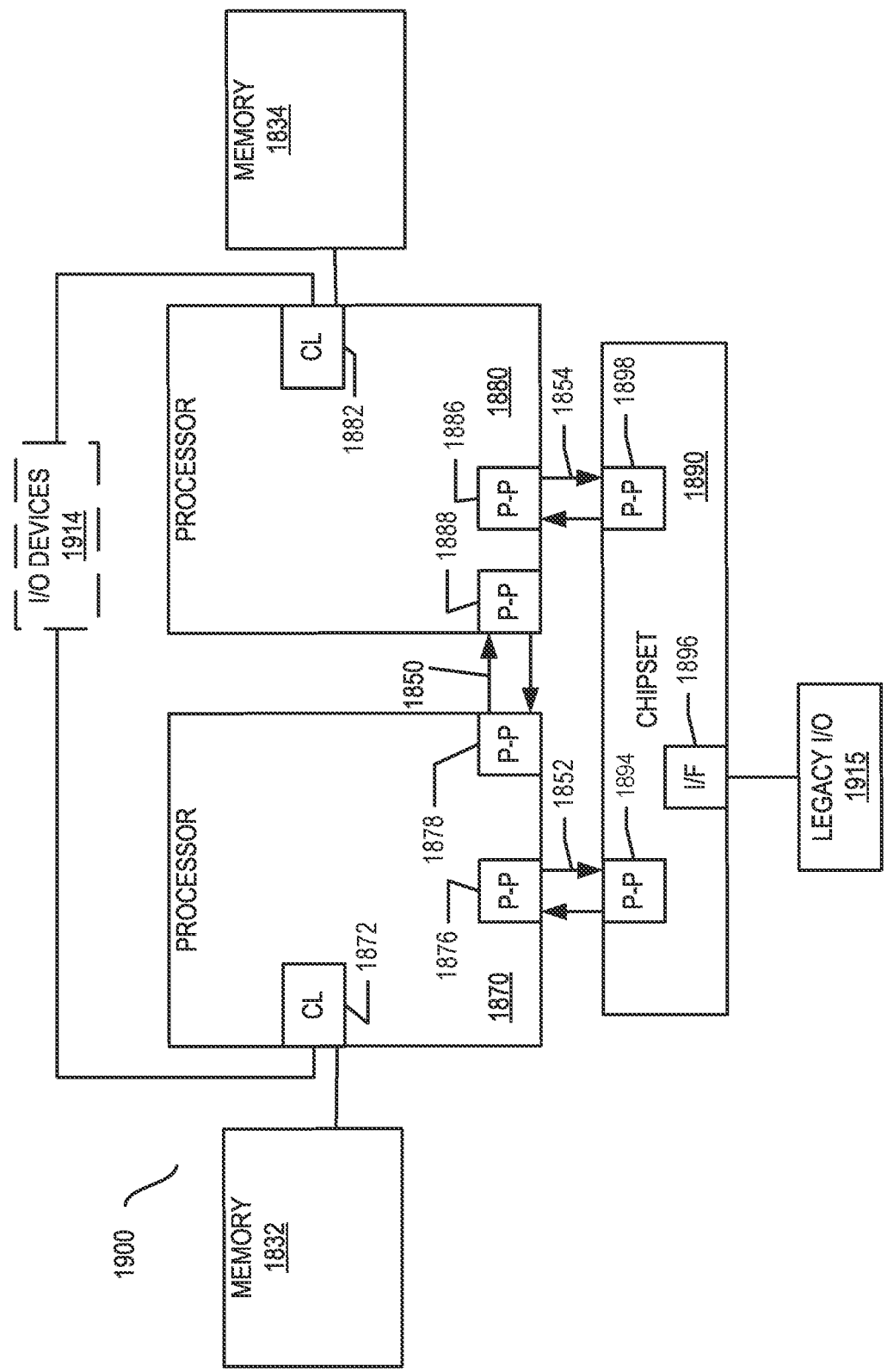

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
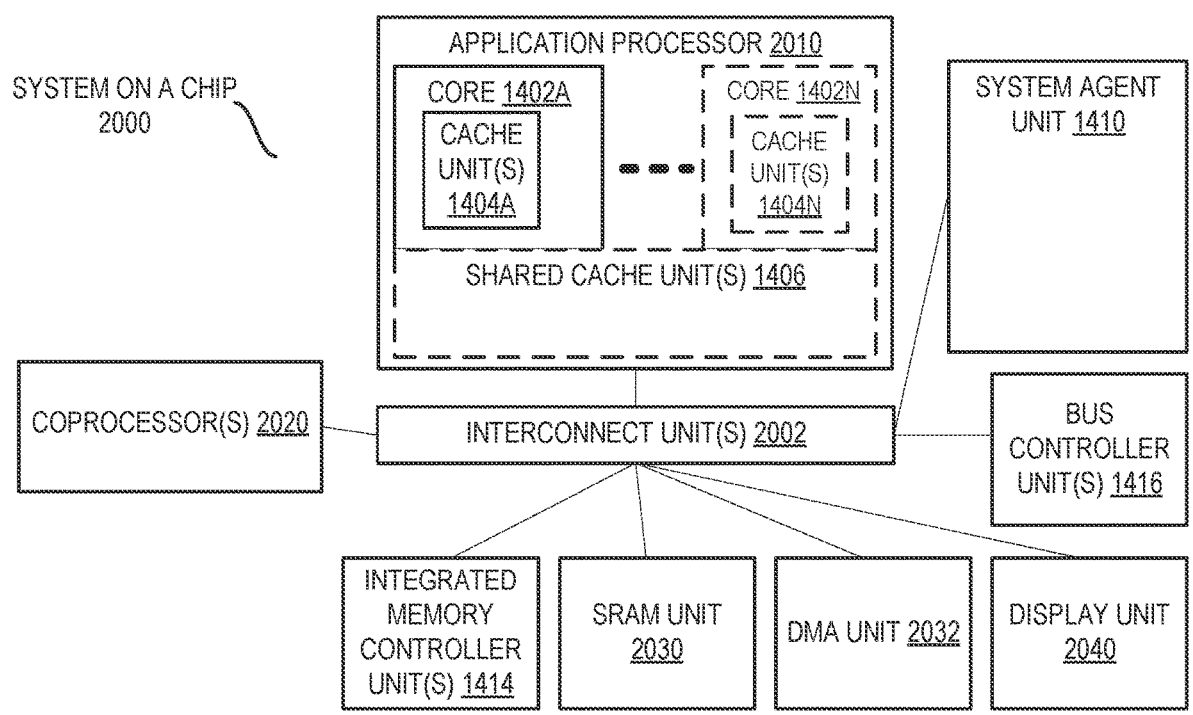

Referring now to FIG. 20, shown is a block diagram of a SoC 2000 in accordance with an embodiment of the present invention. Similar elements in FIG. 14 bear like reference numerals. Also, dashed lined boxes are optional features on more advanced SoCs. In FIG. 20, an interconnect unit(s) 2002 is coupled to: an application processor 2010 which includes a set of one or more cores 1402A-N, which include cache units 1404A-N, and shared cache unit(s) 1406; a system agent unit 1410; a bus controller unit(s) 1416; an integrated memory controller unit(s) 1414; a set or one or more coprocessors 2020 which may include integrated graphics logic, an image processor, an audio processor, and a video processor, general-purpose processors, server processors or processing elements for use in a server-environment, security coprocessors, high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Figure 21:
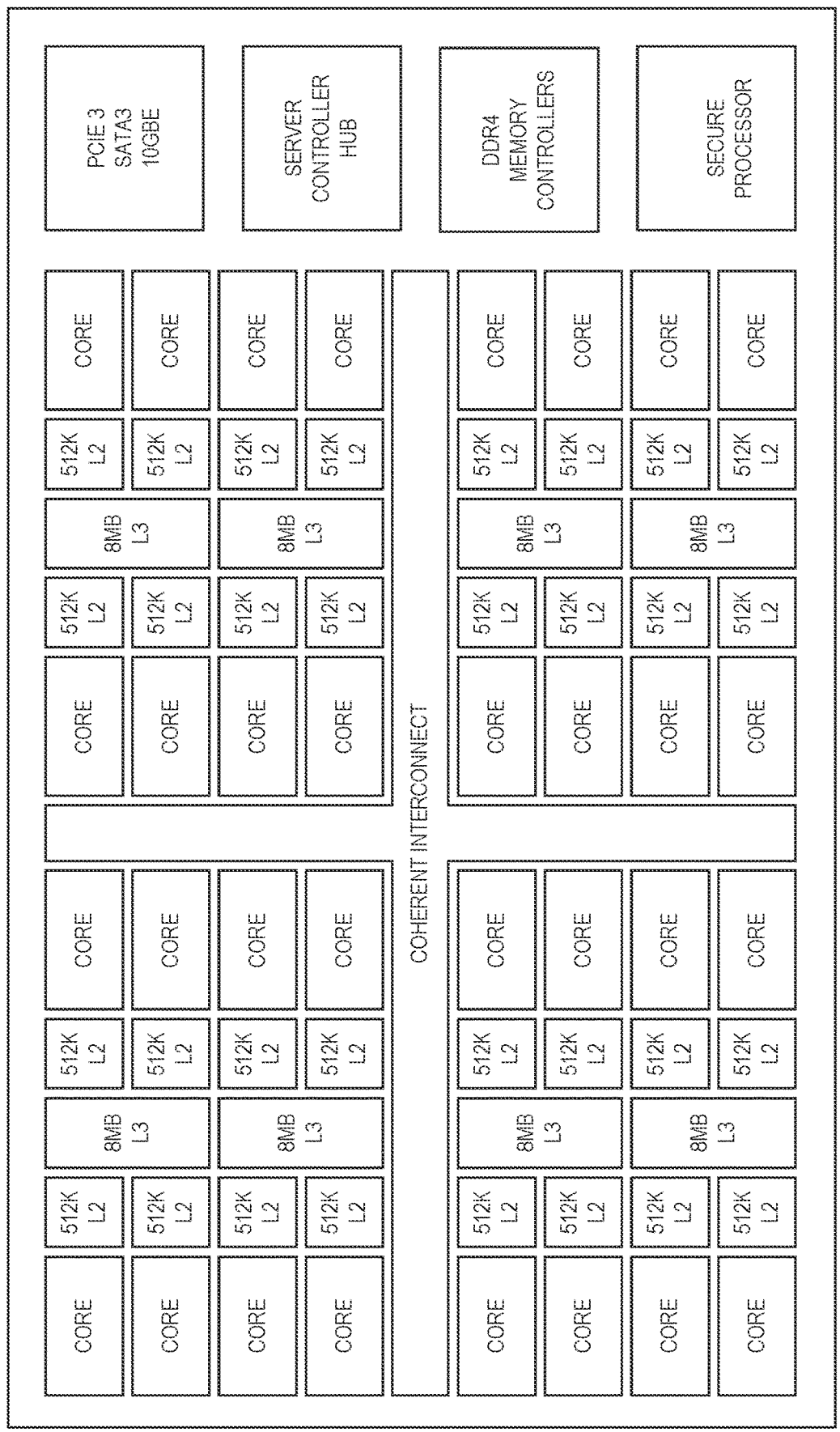

Referring now to FIG. 21, shown is a block diagram of a SoC 2000 in accordance with an embodiment of the present invention.

CONCLUDING REMARKS

Embodiments of the mechanisms disclosed herein may be implemented in hardware, software, firmware, or a combination of such implementation approaches. Embodiments of the invention may be implemented as computer programs or program code executing on programmable systems comprising at least one processor, including, e.g., general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Instructions to be executed by a processor core according to embodiments of the invention may be embodied in a "generic vector friendly instruction format" which is detailed below. In other embodiments, such a format is not utilized and another instruction format is used, however, the description below of the write-mask registers, various data transformations (swizzle, broadcast, etc.), addressing, etc. is generally applicable to the description of the embodiments of the instruction(s) above. Additionally, exemplary systems, architectures, and pipelines are detailed below. Instructions may be executed on such systems, architectures, and pipelines, but are not limited to those detailed.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
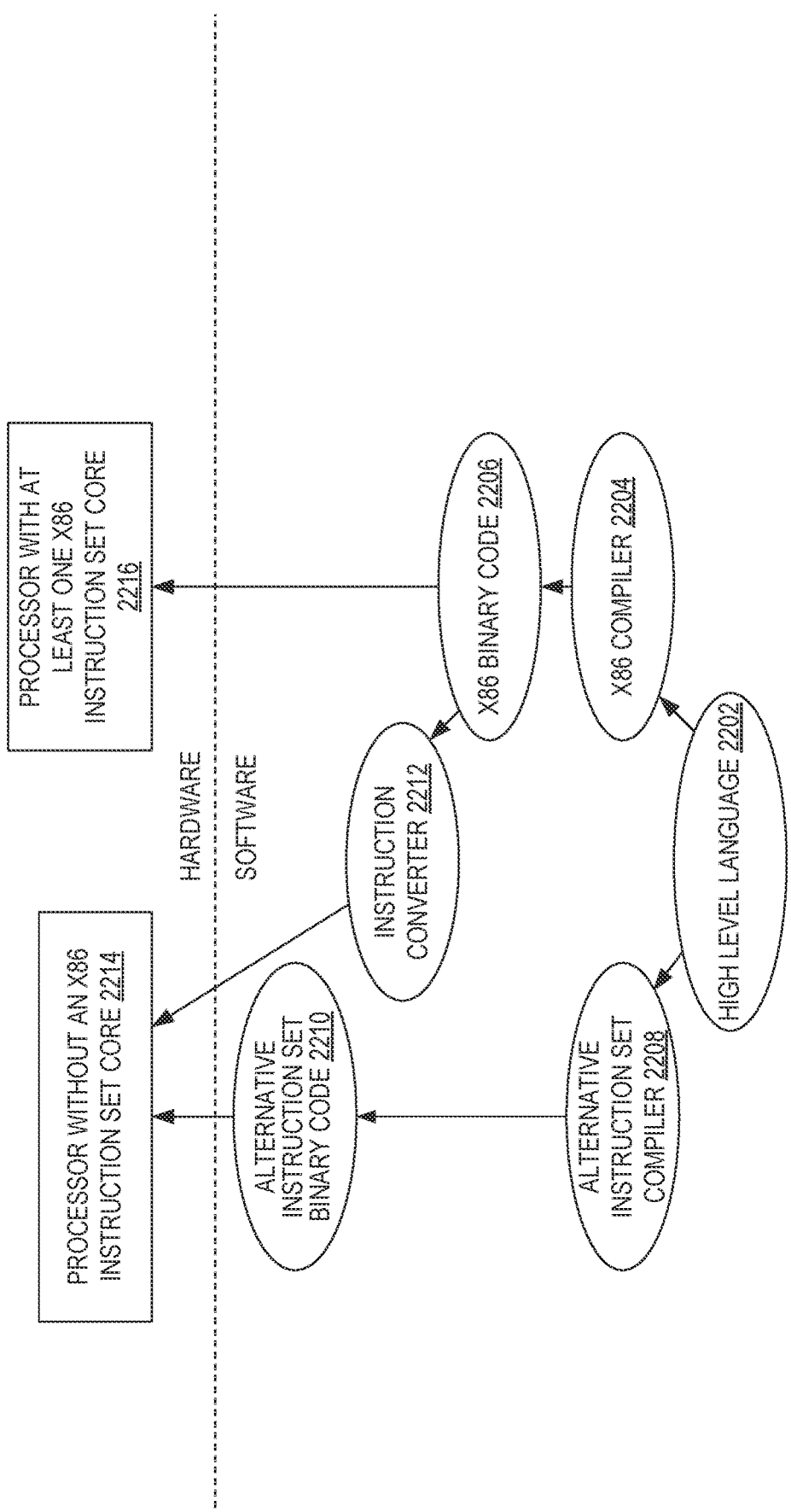
FIG. 22 is a block diagram contrasting the use of a software instruction converter to convert binary instructions in a source instruction set to binary instructions in a target instruction set according to embodiments of the invention.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high-level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

Operations in flow diagrams may have been described with reference to exemplary embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

One or more parts of embodiments of the invention may be implemented using different combinations of software, firmware, and/or hardware. Embodiments may be implemented using an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) may include hardware and software, such as a set of one or more processors coupled to one or more machine-readable storage media to store code for execution on the set of processors and/or to store data. For instance, an electronic device may include non-volatile memory containing the code since the non-volatile memory may persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor comprising:
a decoder to decode a first instruction and a second instruction, the first instruction to allocate a memory region to a software program, the second instruction to specify a first address associated with a data object, the first address having a first memory tag;
range rule circuitry to determine a valid range for the memory region;
address adjustment circuitry to determine a first number of address bits to be used by the software program to manipulate the first address within the valid range and a second number of address bits to include a memory tag to indicate access permission; and
encryption circuitry to encrypt at least a portion of the first address and the memory tag to generate an encrypted address to be returned to the software program;
a cache;
address translation circuitry to translate the first address to a second address, the second address to identify a memory location of the data object;
a comparator to compare the first memory tag and a second memory tag associated with the second address;
a cache controller to detect a cache miss associated with the memory location; and
a memory controller to, in response to the comparator detecting a match between the first memory tag and the second memory tag and the cache controller detecting the cache miss, load the data object from the memory location into the cache.

2. The processor of claim 1, wherein the decoder is also to decode a third instruction, the third instruction to specify an encrypted first address associated with the data object, the processor further comprising decryption circuitry to decrypt the encrypted first address to generate a decrypted address and a decrypted memory tag.

3. The processor of claim 1, wherein the first address is a virtual address and the second address is a physical address.

4. The processor of claim 1, wherein the memory controller is also to prevent loading a cache line corresponding to the memory location until the comparator has detected the match between the first memory tag and the second memory tag.

5. The processor of claim 1, wherein the memory controller is also to, in response to the comparator detecting a mismatch between the first memory tag and the second memory tag, load data not indicative of the data object into a cache line corresponding to the memory location.

6. The processor of claim 1, further comprising pointer security circuitry to provide the first memory tag.

7. The processor of claim 1, wherein the encryption circuitry is also to cryptographically secure the data object at least partially based on the first memory tag.

8. The processor of claim 1, wherein the first memory tag includes an identification tag to identify a type, a function, a memory location, or a use for the data object.

9. The processor of claim 7, wherein the encryption circuitry uses a least a portion of the memory tag to at least partially define a tweak input to an encryption algorithm.

10. The processor of claim 7, wherein the first memory tag includes an encryption tag, wherein the encryption circuitry is to use the encryption tag to identify one of a plurality of encryption keys.

11. The processor of claim 1, wherein the first memory tag includes a small object tag to indicate whether a cache line associated with the memory location is to include a plurality of data objects.

12. The processor of claim 11, wherein the small object tag is to enable sub-cacheline granularity of memory tagging.

13. The processor of claim 1, further comprising integrity check circuitry to generate an integrity check value at least partially based on the first address and an encrypted value of the data object.

14. The processor of claim 13, further comprising pointer security circuitry to detect tampering with the first address at least partially based on the integrity check values.

15. A method comprising:

decoding a first instruction, the first instruction to allocate a memory region to a software program;

determining a valid range for the memory region;

determining a first number of address bits to be used by the software program to manipulate a first address within the valid range and a second number of address bits to include a memory tag to indicate access permission;

encrypting at least a portion of the first address and the memory tag to generate an encrypted address to be returned to the software program;

decoding a second instruction, the second instruction to specify the first address associated with a data object, the first address having a first memory tag;

translating the first address to a second address, the second address to identify a memory location of the data object;

comparing the first memory tag and a second memory tag associated with the second address;

detecting a cache miss associated with the memory location; and loading, in response to detecting a match between the first memory tag and the second memory tag and detecting the cache miss, the data object from the memory location into a cache.

16. The method of claim 15, further comprising:

decoding a third instruction, the third instruction to specify an encrypted first address associated with the data object; and decrypting the encrypted first address to generate a decrypted address and a decrypted memory tag.

17. The method of claim 15, wherein the first address is a virtual address and the second address is a physical address.

18. The method of claim 15, further comprising preventing loading a cache line corresponding to the memory location until the match is detected.

19. The method of claim 15, further comprising loading, in response to detecting a mismatch between the first memory tag and the second memory tag, data not indicative of the data object into a cache line corresponding to the memory location.

20. The method of claim 15, further comprising decrypting an encrypted address to provide the first address and the first memory tag.

\* \* \* \* \*